(12) United States Patent
Horng et al.

(10) Patent No.: US 12,535,364 B2
(45) Date of Patent: Jan. 27, 2026

(54) THERMAL SENSOR USING INVERSION DIFFUSIVITY RESISTANCE

(71) Applicant: Taiwan Semiconductor Manufacturing Company, Ltd., Hsinchu (TW)

(72) Inventors: Jaw-Juinn Horng, Hsinchu (TW); Szu-Lin Liu, Hsinchu (TW); Yung-Chow Peng, Hsinchu (TW); Shenggao Li, Cupertino, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 801 days.

(21) Appl. No.: 17/735,887

(22) Filed: May 3, 2022

(65) Prior Publication Data

US 2023/0358618 A1    Nov. 9, 2023

(51) Int. Cl.
*G01K 7/24*         (2006.01)
*H10D 84/83*        (2025.01)

(52) U.S. Cl.
CPC ............... *G01K 7/24* (2013.01); *H10D 84/83* (2025.01)

(58) Field of Classification Search
CPC ............ G01K 7/16; G01K 7/18; G01K 7/183
See application file for complete search history.

(56) References Cited

U.S. PATENT DOCUMENTS

| | | | |
|---|---|---|---|
| 2002/0177277 A1* | 11/2002 | Baliga | H10D 62/393 |
| | | | 257/E29.066 |
| 2003/0002372 A1* | 1/2003 | Ishida | G11C 7/12 |
| | | | 365/203 |
| 2011/0068399 A1* | 3/2011 | Bryant | H10D 86/215 |
| | | | 257/E29.264 |
| 2019/0028065 A1* | 1/2019 | Mahon | H10D 30/475 |
| 2021/0102851 A1* | 4/2021 | Kondoh | G01L 1/205 |
| 2021/0303812 A1* | 9/2021 | Mainguet | G01K 7/16 |
| 2023/0015578 A1* | 1/2023 | Daryanani | G01K 7/16 |

FOREIGN PATENT DOCUMENTS

| | | |
|---|---|---|
| CN | 1815737 A | 8/2006 |
| TW | 202020411 A | 6/2020 |

OTHER PUBLICATIONS

Wikipedia: Temperature Coefficient https://en.wikipedia.org/w/index.php?title=Temperature_coefficient&oldid=959540703 (Year: 2020).*

* cited by examiner

*Primary Examiner* — Britt D Hanley
*Assistant Examiner* — Jason James Greaving
(74) *Attorney, Agent, or Firm* — Merchant & Gould P.C.

(57) ABSTRACT

A device including a first plurality of metal-oxide semiconductor field-effect transistors electrically connected in series. Each of the first plurality of metal-oxide semiconductor field-effect transistors includes a first gate structure, a first drain/source region on one side of the first gate structure, and a second drain/source region on another side of the first gate structure. The first gate structure of each of the first plurality of metal-oxide semiconductor field-effect transistors is configured to receive a bias voltage to bias on the first plurality of metal-oxide semiconductor field-effect transistors and provide a temperature dependent resistance through the first plurality of metal-oxide semiconductor field-effect transistors to measure temperatures.

20 Claims, 13 Drawing Sheets

THERMAL SENSOR USING INVERSION DIFFUSIVITY RESISTANCE

BACKGROUND

In thermal sensing, some devices utilize a P/N junction, such as a base-emitter junction in a bipolar junction transistor (BJT) or a P/N junction in a diode, to measure the temperature of a hot spot in the device. For example, constant current is passed through a base-emitter junction to produce a voltage between the base and the emitter of a BJT. This base-emitter voltage Vbe is a linear function of the absolute temperature and the overall forward voltage drop has a temperature coefficient of approximately 2 millivolts (my) per degree C. (° C.). Metal-oxide semiconductor field-effect transistor (MOSFET) circuits sometimes include an N-well diffusion layer within the substrate to facilitate the use of a P/N junction thermal sensor. However, newer processes do not include N-well diffusion layers, such that it is difficult to form a P/N junction for thermal sensing. Also, although sub-threshold MOSFET operation can be used to perform thermal sensing, often, the performance of sub-threshold MOSFETs is not consistent. In addition, resistance temperature detectors (RTDs) can be used for thermal sensing. However, RTDs use metal for thermal sensing, where bottom layer metal is usually reserved for routing and upper layer metal is often far away from the hot spot being monitored.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the disclosure and are not intended to be limiting.

DETAILED DESCRIPTION

Figure 1:
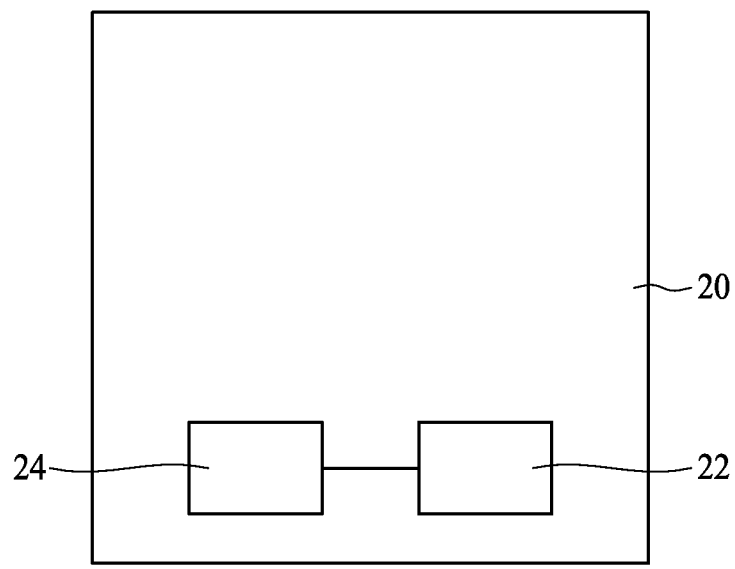
FIG. 1 is a diagram schematically illustrating a semiconductor device that includes at least one inversion diffusivity resistance/resistor (IDR) thermal sensor, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Disclosed embodiments include devices that include one or more inversion diffusivity resistors (IDRs) configured for measuring a temperature of the device. Each of the IDRs provides a resistance that is dependent on the temperature of the IDR in the device. In some embodiments, the IDR includes a plurality of MOSFETs that are electrically connected in series, such that the drain/source paths of the MOSFETs are connected in series to one another. Each of the MOSFETs includes a gate structure, a first drain/source region on one side of the gate structure, and a second drain/source region on the other side of the gate structure. The gate structure of each of the MOSFETs is electrically connected to a voltage that biases on the corresponding MOSFET, which provides a temperature dependent resistance through the drain/source paths of the series connected MOSFETs. The IDR is used to measure a temperature of the device, such as the temperature near or at a hot spot in the device.

In some embodiments, an IDR resistance is measured through each of multiple series connected MOSFET circuits to measure a temperature of the device. In some embodiments, an IDR resistance is measured through a parallel connected combination of multiple series connected MOSFET circuits to measure a temperature of the device. In some embodiments, a differential voltage and/or resistance is measured between different IDR units to measure a temperature of the device.

Disclosed embodiments further include IDR units arranged in rows and columns in a device to measure a temperature of the device. Also, disclosed embodiments include IDR units arranged in rows and columns in a device and arranged next to and/or around a hot spot of the device to measure a temperature of the hot spot of the device. In some embodiments, each of the IDR units has the same number of MOSFETs connected in series to one another. In some embodiments, at least one IDR unit has more MOSFETs connected in series to one another and at least one IDR unit has fewer MOSFETs connected in series to one another.

Advantages of using one or more IDRs to measure a temperature of a hot spot and/or a device include: having a thermal sensing function without having an N-well diffusion layer; having an alternative to P/N junctions, sub-threshold MOSFET operations, and RTDs in thermal sensing; and increasing the accuracy of monitoring the temperature of a hot spot, where the series connected MOSFETs can be placed near the hot spot being monitored. Also, the series connected MOSFETs can be laid-out in the same layers as other MOSFETs, which reduces or saves on routing efforts; the size of the MOSFETs can be the same as other MOSFETs in the device, such that the IDR thermal sensor can be easily combined and/or merged with the core device area; and the IDR thermal sensor is independent of MOSFET process changes, since the series connected MOSFETs are always biased on and since most of the inversion diffusivity resistance is in the diffusion area and not in the inversion area under the gate structure.

FIG. 1 is a diagram schematically illustrating a semiconductor device 20 that includes at least one IDR thermal sensor 22, in accordance with some embodiments. The at least one IDR thermal sensor 22 is configured for measuring a temperature of the device 20. In some embodiments, the at least one IDR thermal sensor 22 is configured for measuring the temperature of a hot spot in the device 20. In some embodiments, the semiconductor device 20 is a memory device, a processing device, a digital logic device, an analog device, a mixed signal device, or a combination of two or more of these devices.

The IDR thermal sensor 22 includes at least one IDR unit that includes MOSFETs electrically connected in series, such that the drain/source paths of the MOSFETs are connected in series to one another. Each of the MOSFETs includes a gate structure that is electrically connected to a voltage that biases on the corresponding MOSFET, which provides an inversion diffusivity resistance through the drain/source paths of the series connected MOSFETs from a first node to a second node. The inversion diffusivity resistance is temperature dependent and used to measure a temperature in the device 20.

In some embodiments, the semiconductor device 20 includes a temperature measurement circuit 24 that is electrically coupled to the IDR thermal sensor 22. In some embodiments, the temperature measurement circuit 24 is configured to provide a constant current to the first node of an DR unit and measure the voltage across the IDR unit from the first node to the second node. The temperature measurement circuit 24 is further configured to determine the temperature dependent resistance of the IDR unit and to determine the temperature of the IDR unit (and the device 20) from the measured temperature dependent resistance. In some embodiments, the measured temperature dependent resistance is correlated to a temperature value. In some embodiments, the measured temperature dependent resistance is correlated to a temperature value via a table in memory.

In some embodiments, the temperature measurement circuit 24 is configured to provide one or more voltages to the gates of the transistors in an IDR unit to bias on each of the transistors in the IDR unit. Also, in some embodiments, the temperature measurement circuit 24 is configured to provide a higher voltage to the first node of the IDR unit and a lower voltage to the second node of the IDR unit, and to determine the temperature dependent resistance of the IDR unit and the temperature of the IDR unit (and the device 20) from the measured temperature dependent resistance. In some embodiments, the measured temperature dependent resistance is correlated to a temperature value. In some embodiments, the measured temperature dependent resistance is correlated to a temperature value via a table in memory.

In some embodiments, the inversion diffusivity resistance is measured through each of multiple IDR units to measure a temperature of the device. In some embodiments, the inversion diffusivity resistance is measured through an IDR unit that includes a parallel connected combination of multiple series connected MOSFET circuits to measure a temperature of the device. In some embodiments, a differential voltage and/or resistance is measured between different IDR units to measure a temperature of the device.

Also, in some embodiments, IDR units are arranged in rows and columns in a device and/or IDR units are arranged next to and/or around a hot spot of the device to measure a temperature of the device. In some embodiments, each of the IDR units has the same number of MOSFETs connected in series to one another. In some embodiments, at least one IDR unit has more MOSFETs connected in series to one another and at least one IDR unit has fewer MOSFETs connected in series to one another.

Figure 2:
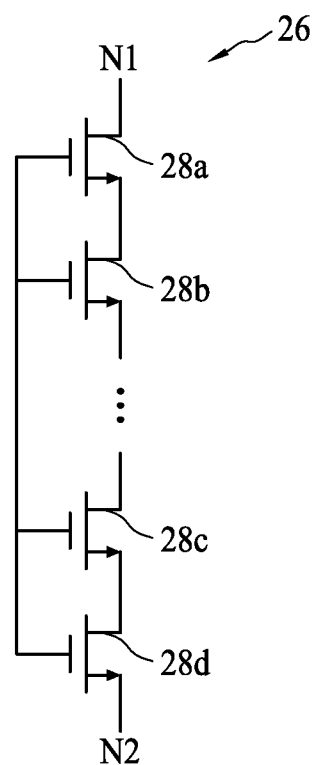
FIG. 2 is a diagram schematically illustrating an IDR unit that includes a plurality of MOSFETs connected in series to one another, in accordance with some embodiments.

FIG. 2 is a diagram schematically illustrating an IDR unit 26 that includes a plurality of MOSFETs 28a-28d connected in series to one another, in accordance with some embodiments. The MOSFETs 28a-28d are n-type MOSFETs, also referred to as NMOS transistors. In other embodiments, the MOSFETs 28a-28d can be p-type MOSFETs, also referred to as PMOS transistors. In some embodiments, the IDR unit 26 is at least part of the IDR thermal sensor 22 (shown in FIG. 1).

Each of the MOSFETs 28a-28d includes a gate structure, a first drain/source region on one side of the gate structure, and a second drain/source region on the other side of the gate structure. The MOSFETs 28a-28d are electrically connected in series, such that the second drain/source region of one MOSFET is electrically connected to the first drain/source region of the next MOSFET to connect the drain/source paths of the MOSFETs 28a-28d in series with one another.

The first drain/source region of MOSFET 28a is electrically connected to receive a current and/or a voltage at node 1 (N1), and the second drain/source region of MOSFET 28a is electrically connected to the first drain/source region of MOSFET 28b. The second drain/source region of MOSFET 28b is electrically connected to the first drain/source region of the next MOSFET in line, down to MOSFET 28c. Where, the second drain/source region of MOSFET 28c is electrically connected to the first drain/source region of MOSFET 28d, and the second drain/source region of MOSFET 28d is electrically connected to a reference, such as ground, at node 2 (N2).

The gate structures of the MOSFETs 28a-28d are electrically connected to one another and to a voltage VDD that biases on the NMOS MOSFETs 28a-28d, which provides a temperature dependent inversion diffusivity resistance through the NMOS MOSFETs 28a-28d, from N1 to N2. The temperature dependent inversion diffusivity resistance of the IDR unit 26 is used to measure a temperature of the device, such as the temperature near a hot spot in the device. In other embodiments, the MOSFETs 28a-28d can be PMOS MOSFETs, such that a low reference voltage or a ground voltage is provided to the gate structures of the MOSFETs 28a-28d to bias on the MOSFETs 28a-28d and provide the temperature dependent inversion diffusivity resistance through the MOSFETs 28a-28d from N1 to N2.

The series connected MOSFETs 28a-28d provide an inversion diffusivity resistance R that is dependent on the number of MOSFETs 28a-28d connected in series and on the temperature of the IDR unit 26. Connecting more MOSFETs in series, increases the resistance through the series connected MOSFETs 28a-28d. In some embodiments, a constant current I is provided at N1 and the voltage from N1 to N2 is measured to determine the resistance through the IDR unit 26. The temperature dependency of the resistance is used to determine the temperature of the IDR unit 26 and the device.

Figure 3:
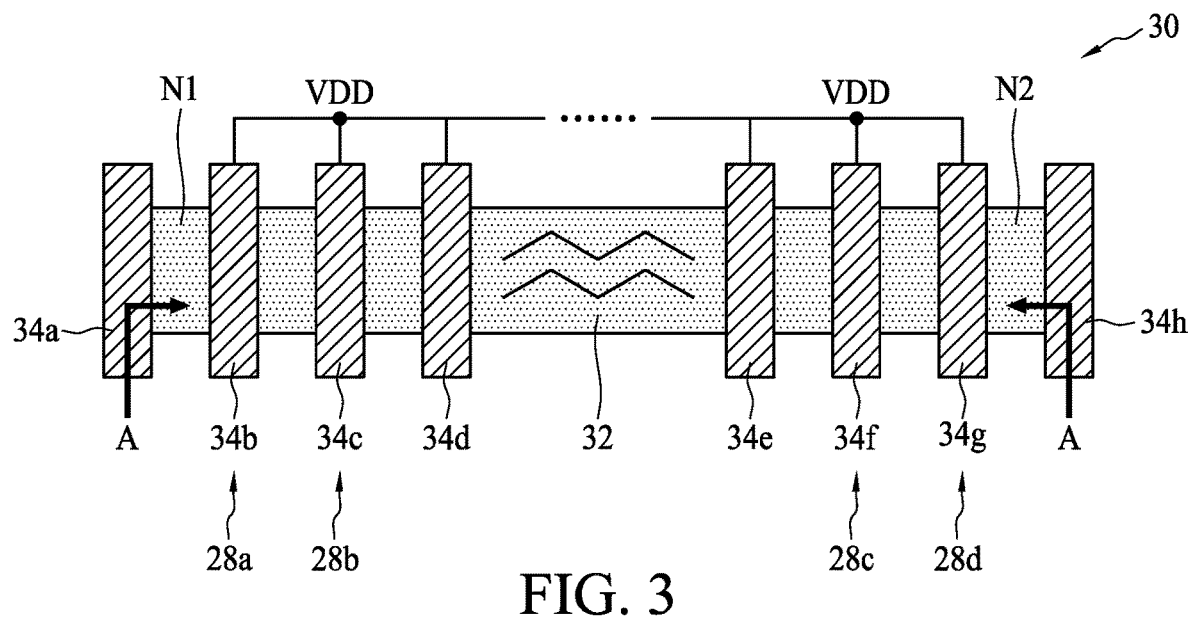
FIG. 3 is a diagram schematically illustrating an IDR layout of the IDR unit of FIG. 2, in accordance with some embodiments.

FIG. 3 is a diagram schematically illustrating an IDR layout 30 of the IDR unit 26 of FIG. 2, in accordance with some embodiments. The IDR layout 30 includes an active region 32 and gate structures 34a-34h situated across the active region 32. In some embodiments, the IDR layout 30 is at least part of the IDR thermal sensor 22 (shown in FIG. 1).

The gate structures 34a-34h include the gate structures of the MOSFETs 28a-28d of the IDR unit 26. Each of the gate structures 34b-34g corresponds to an NMOS transistor in the IDR unit 26, where the gate structures 34b, 34c, 34f, and 34g correspond to the MOSFETs 28a, 28b, 28c, and 28d, respectively.

The drain/source region on one side of the gate structure 34b corresponds to the first drain/source region of MOSFET 28a and is electrically connected to receive a current and/or a voltage at N1. The drain/source region on the other side of the gate structure 34b corresponds to the second drain/source region of the MOSFET 28a and to the first drain/source region of MOSFET 28b on one side of the gate structure 34c. The drain/source region on the other side of the gate structure 34c corresponds to the second drain/source region of the MOSFET 28b and to the first drain/source region of the next in line MOSFET on one side of the gate structure 34d. The drain/source region on the other side of the gate structure 34d corresponds to the second drain/source region of the next in line MOSFET. This continues to the drain/source region on one side of the gate structure 34e and the drain/source region on the other side of the gate structure 34e that corresponds to the first drain/source region of the MOSFET 28c on one side of the gate structure 34f. The drain/source region on the other side of the gate structure 34f corresponds to the second drain/source region of the MOSFET 28c and to the first drain/source region of the MOSFET 28d on one side of the gate structure 34g. The other side of the gate structure 34g corresponds to the second drain/source region of the MOSFET 28d and is electrically connected to a reference, such as ground, at N2.

The gate structures 34b-34g are connected to one another and to VDD to bias on the corresponding NMOS transistors and provide a temperature dependent inversion diffusivity resistance through the IDR layout 30 from N1 to N2. In some embodiments, the gate structures 34a and 34h are dummy gate structures.

Figure 4:
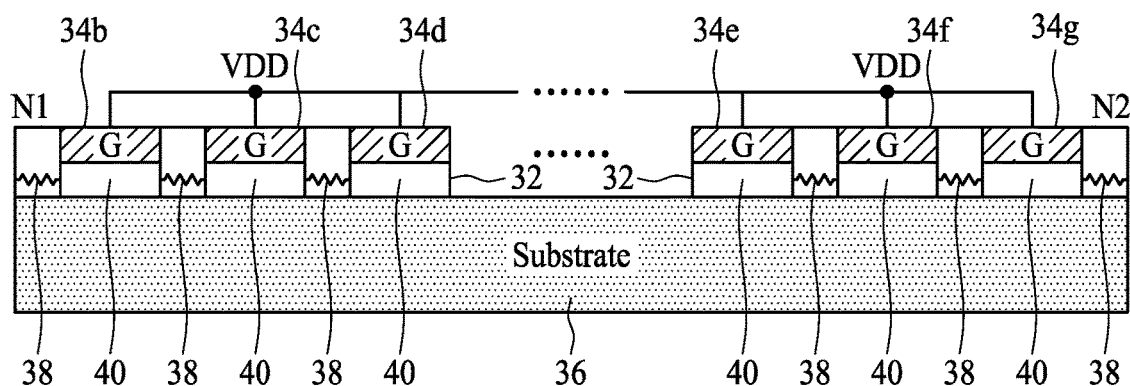
FIG. 4 is a diagram schematically illustrating a cross-section of the IDR layout taken along the line A-A in FIG. 3, in accordance with some embodiments.

FIG. 4 is a diagram schematically illustrating a cross-section of the IDR layout 30 taken along the line A-A in FIG. 3, in accordance with some embodiments. The active region 32 is disposed on a substrate 36, and the gate structures 34b-34g are disposed on the active region 32 to form the NMOS transistors of the IDR layout 30. The gate structures 34b-34g are connected to one another and to VDD to bias on each of the NMOS transistors of the DR layout 30 and provide the temperature dependent inversion diffusivity resistance through the IDR layout 30 from N1 to N2.

The inversion diffusivity resistance through the DR layout 30 includes diffusion resistances 38 in the drain/source regions of the NMOS transistors of the IDR layout 30 and inversion layer resistances 40 in the inversion layers under the gate structures 34b-34g of the NMOS transistors of the IDR layout 30. The diffusion resistances 38 are larger than the inversion layer resistances 40.

In some embodiments, a constant current I is provided at N1 and the voltage from N1 to N2 is measured to determine the resistance through the NMOS transistors of the DR layout 30. The temperature dependencies of the diffusion resistances 38 and the inversion layer resistances 40 are used to determine the temperature of the IDR unit 26 and the device.

Figure 5:
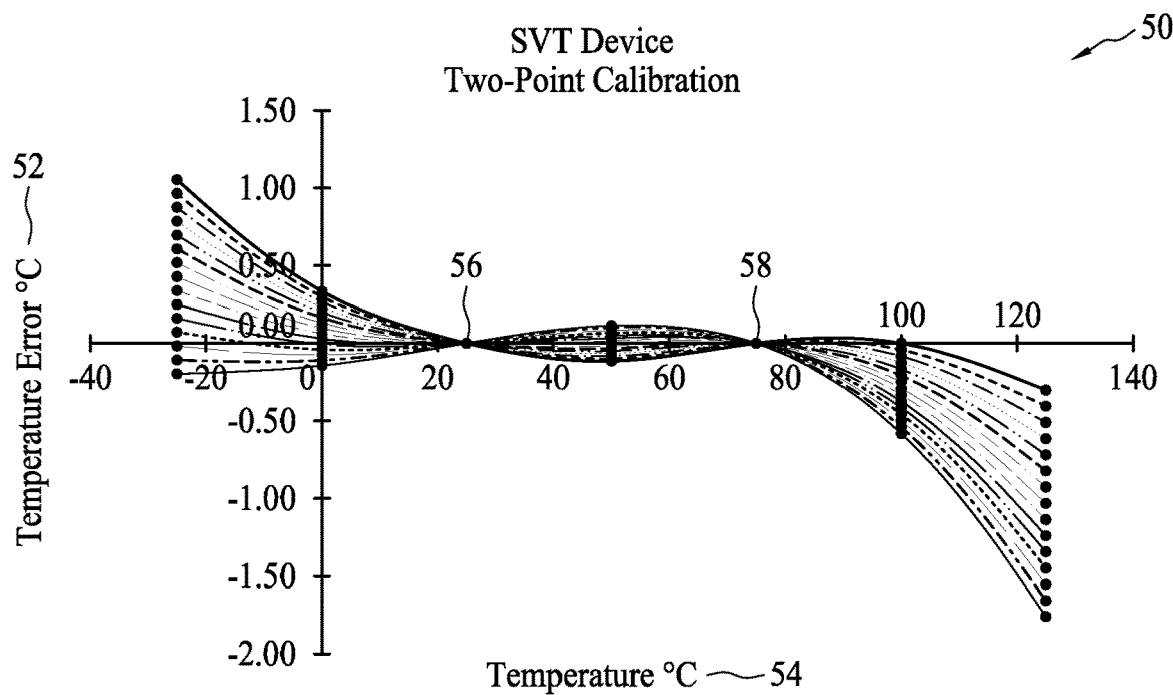
FIG. 5 is a diagram schematically illustrating a graph of the error in measuring temperature using standard voltage threshold (SVT) MOSFET devices in an IDR unit, in accordance with some embodiments.

FIG. 5 is a diagram schematically illustrating a graph 50 of the error in measuring temperature using standard voltage threshold (SVT) MOSFET devices in an DR unit, such as IDR unit 26, in accordance with some embodiments. The graph 50 displays the temperature error in degrees Centigrade or Celsius (° C.) on the y-axis 52 versus the temperature in ° C. on the x-axis 54. The graph 50 is calibrated at two points including a first calibration point 56 at about 25° C. and a second calibration point 58 at about 75° C.

Using SVT MOSFETs in an IDR unit and two-point calibration results in a temperature error of between −0.25° C. and about 1° C. at −25° C. and between −0.25° C. and −1.75° C. at 125° C. The error is about +/−1.5° C.

Figure 6:
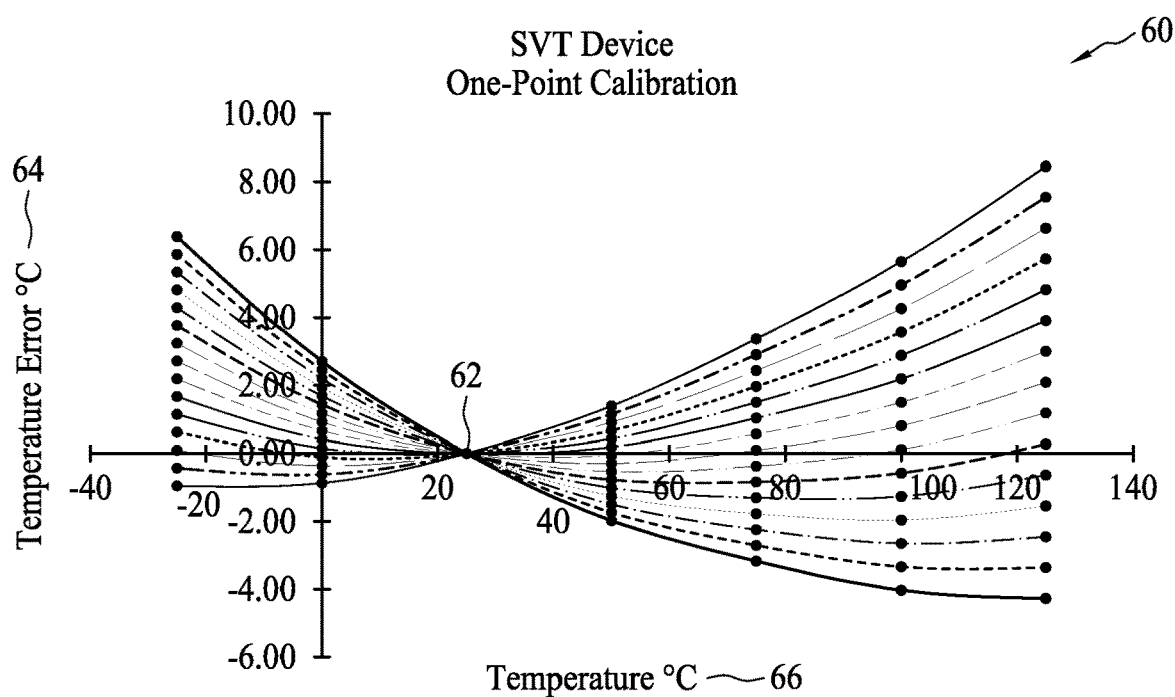
FIG. 6 is a diagram schematically illustrating a graph of the error in measuring temperature using SVT MOSFET devices in an IDR unit and one-point calibration, in accordance with some embodiments.

FIG. 6 is a diagram schematically illustrating a graph 60 of the error in measuring temperature using SVT MOSFET devices in an IDR unit, such as IDR unit 26, and calibration at one-point 62, in accordance with some embodiments. The graph 60 displays the temperature error in ° C. on the y-axis 64 versus the temperature in ° C. on the x-axis 66. The graph 60 is calibrated at one calibration point 62 at about 25° C.

Using SVT MOSFETs in an IDR unit and one-point calibration results in a temperature error of between −1° C. and about 6° C. at −25° C. and between −4° C. and about 8° C. at 125° C. The error is about +/−7° C.

Figure 7:
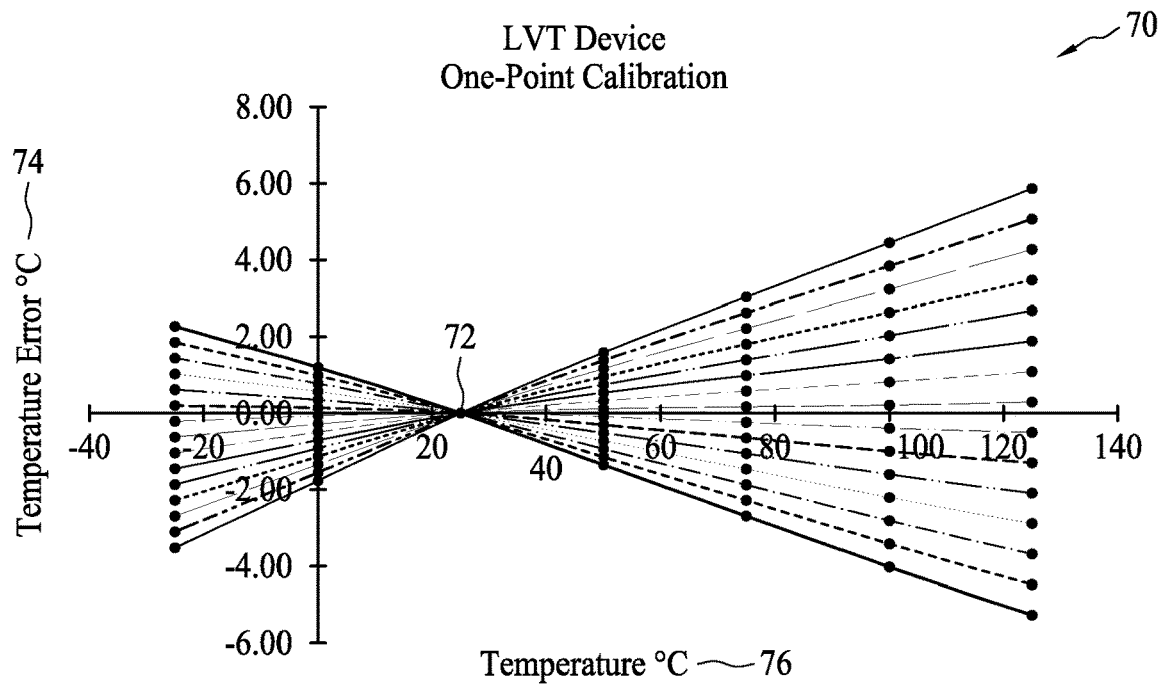
FIG. 7 is a diagram schematically illustrating a graph of the error in measuring temperature using low threshold voltage (LVT) MOSFET devices in an IDR unit and one-point calibration, in accordance with some embodiments.

FIG. 7 is a diagram schematically illustrating a graph 70 of the error in measuring temperature using low threshold voltage (LVT) MOSFET devices in an DR unit, such as DR unit 26, and calibration at one-point 72, in accordance with some embodiments. The graph 70 displays the temperature error in ° C. on the y-axis 74 versus the temperature in ° C. on the x-axis 76. The graph 70 is calibrated at one calibration point 72 at about 25° C.

Using LVT MOSFETs in an DR unit and one-point calibration results in a temperature error of between −4° C. and about 2° C. at −25° C. and between −6° C. and 6° C. at 125° C. The error is about +/−5° C.

Figure 8:
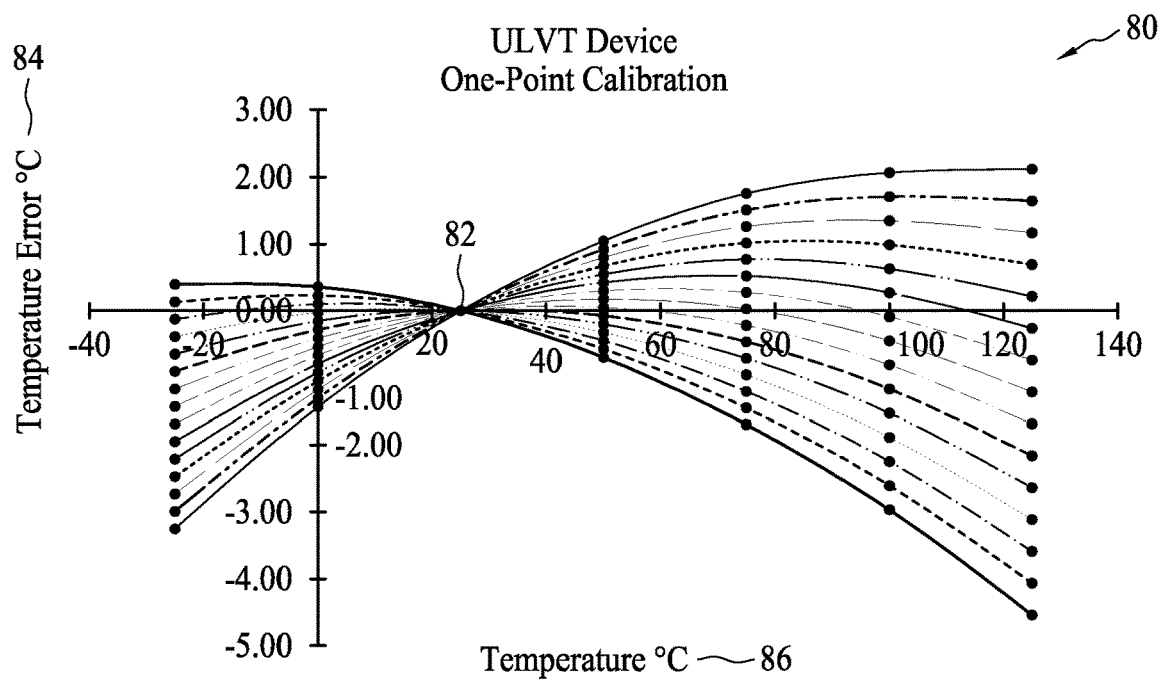
FIG. 8 is a diagram schematically illustrating a graph of the error in measuring temperature using ultra low threshold voltage (ULVT) MOSFET devices in an IDR unit and one-point calibration, in accordance with some embodiments.

FIG. 8 is a diagram schematically illustrating a graph 80 of the error in measuring temperature using ultra low threshold voltage (ULVT) MOSFET devices in an DR unit, such as IDR unit 26, and calibration at one-point 82, in accordance with some embodiments. The graph 80 displays the temperature error in ° C. on the y-axis 84 versus the temperature in ° C. on the x-axis 86. The graph 80 is calibrated at one calibration point 82 at about 25° C.

Using ULVT MOSFETs in an IDR unit and one-point calibration results in a temperature error of between −3.5 and 0.5° C. at −25° C. and between −4.5° C. and about 2° C. at 125° C. The error is about +/−3° C.

Thus, as illustrated in FIGS. 5-8 with one-point calibration, using the ULVT MOSFETs to determine the temperature of a device results in the smallest temperature errors, using the LVT MOSFETs results in slightly larger temperature errors, and using the SVT MOSFETs results in the largest temperature errors. Also, using two-point calibration, such as with the SVT MOSFETs, results in the smallest temperature error.

Figure 9:
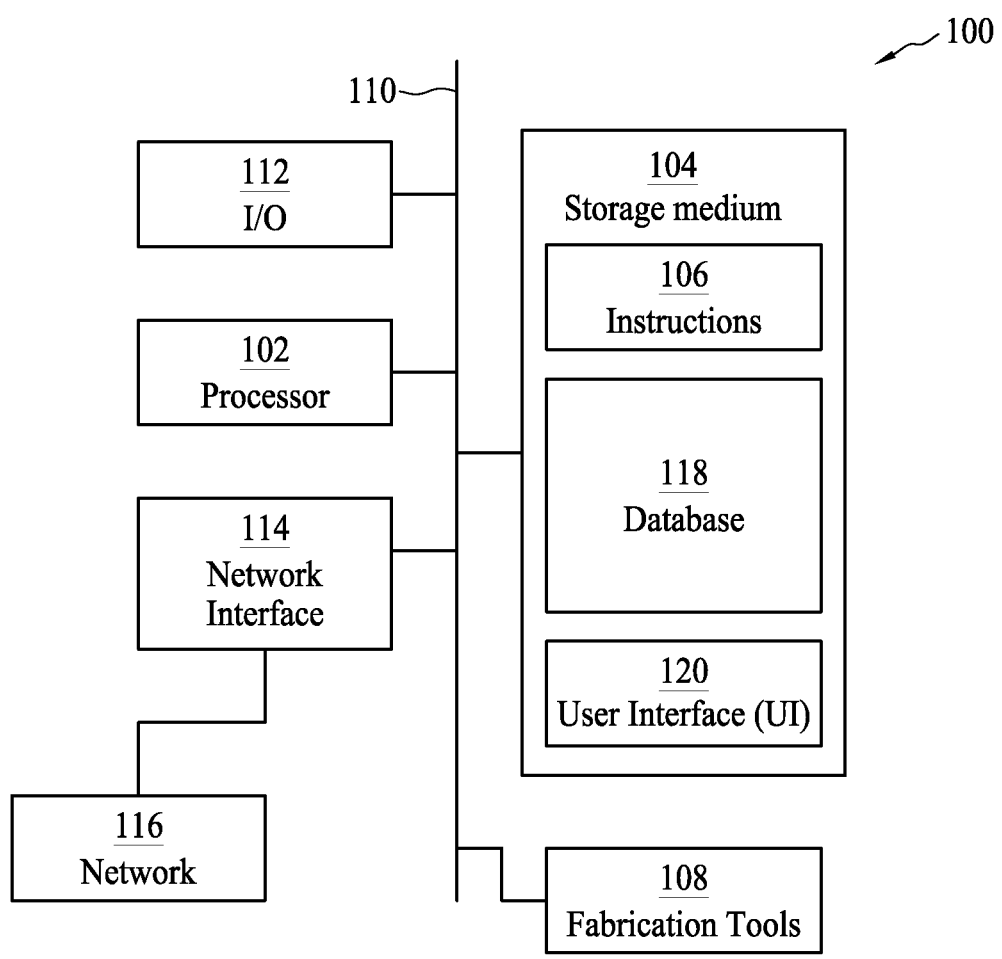
FIG. 9 is a block diagram schematically illustrating an example of a computer system configured to provide an integrated circuit (IC) device that includes at least one IDR thermal sensor, in accordance with some embodiments.

FIG. 9 is a block diagram schematically illustrating an example of a computer system 100 configured to provide an integrated circuit (IC) device, i.e., a semiconductor device, that includes at least one IDR thermal sensor, such as the IDR thermal sensor 22 (shown in FIG. 1), in accordance with some embodiments. Some or all the design and manufacture of ICs including the IDR thermal sensor 22 which includes at least one IDR unit, such as IDR unit 26 and IDR layout 30, and/or the temperature measurement circuit 24 can be performed by or with the computer system 100. Also, some or all the design and manufacture of other ICs described herein can be performed by or with the computer system 100. In some embodiments, the computer system 100 includes an EDA system.

In some embodiments, the system 100 is a general-purpose computing device including a processor 102 and a non-transitory, computer-readable storage medium 104. The computer-readable storage medium 104 may be encoded with, e.g., store, computer program code such as executable instructions 106. Execution of the instructions 106 by the processor 102 provides (at least in part) a design tool that implements a portion or all the functions of the system 100, such as pre-layout simulations, post-layout simulations, rerouting of the IC, and a final layout for manufacturing. Further, fabrication tools 108 are included to further layout and physically implement the design and manufacture of the ICs. In some embodiments, the system 100 includes a commercial router. In some embodiments, the system 100 includes an APR system.

The processor 102 is electrically coupled to the computer-readable storage medium 104 by a bus 110 and to an I/O interface 112 by the bus 110. A network interface 114 is also electrically connected to the processor 102 by the bus 110. The network interface 114 is connected to a network 116, so that the processor 102 and the computer-readable storage medium 104 can connect to external elements using the network 116. The processor 102 is configured to execute the computer program code or instructions 106 encoded in the computer-readable storage medium 104 to cause the system 100 to perform a portion or all the functions of the system 100. In some embodiments, the processor 102 is a central processing unit (CPU), a multi-processor, a distributed processing system, an application specific integrated circuit (ASIC), and/or a suitable processing unit.

In some embodiments, the computer-readable storage medium 104 is an electronic, magnetic, optical, electromagnetic, infrared, and/or semiconductor system or apparatus or device. For example, the computer-readable storage medium 104 can include a semiconductor or solid-state memory, a magnetic tape, a removable computer diskette, a random-access memory (RAM), a read-only memory (ROM), a rigid magnetic disk, and/or an optical disk. In some embodiments using optical disks, the computer-readable storage medium 104 can include a compact disk, read only memory (CD-ROM), a compact disk read/write memory (CD-R/W), and/or a digital video disc (DVD).

In some embodiments, the computer-readable storage medium 104 stores computer program code or instructions 106 configured to cause the system 100 to perform a portion or all the functions of the system 100. In some embodiments, the computer-readable storage medium 104 also stores information which facilitates performing a portion or all the functions of the system 100. In some embodiments, the computer-readable storage medium 104 stores a database 118 that includes one or more of component libraries, digital circuit cell libraries, and databases.

The EDA system 100 includes the I/O interface 112, which is coupled to external circuitry. In some embodiments, the I/O interface 112 includes a keyboard, keypad, mouse, trackball, trackpad, touchscreen, and/or cursor direction keys for communicating information and commands to the processor 102.

The network interface 114 is coupled to the processor 102 and allows the system 100 to communicate with the network 116, to which one or more other computer systems are connected. The network interface 114 can include: wireless network interfaces such as BLUETOOTH, WIFI, WIMAX, GPRS, or WCDMA; or wired network interfaces such as ETHERNET, USB, or IEEE-1364. In some embodiments, a portion or all the functions of the system 100 can be performed in two or more systems that are like system 100.

The system 100 is configured to receive information through the I/O interface 112. The information received through the I/O interface 112 includes one or more of instructions, data, design rules, libraries of components and cells, and/or other parameters for processing by processor 102. The information is transferred to the processor 102 by the bus 110. Also, the system 100 is configured to receive information related to a user interface (UI) through the I/O interface 112. This UI information can be stored in the computer-readable storage medium 104 as a UI 120.

In some embodiments, a portion or all the functions of the system 100 are implemented via a standalone software application for execution by a processor. In some embodiments, a portion or all the functions of the system 100 are implemented in a software application that is a part of an additional software application. In some embodiments, a portion or all the functions of the system 100 are implemented as a plug-in to a software application. In some embodiments, at least one of the functions of the system 100 is implemented as a software application that is a portion of an EDA tool. In some embodiments, a portion or all the functions of the system 100 are implemented as a software application that is used by the system 100. In some embodiments, a layout diagram is generated using a tool such as VIRTUOSO available from CADENCE DESIGN SYSTEMS, Inc., or another suitable layout generating tool.

In some embodiments, the IC device layouts and other processes are realized as functions of a program stored in a non-transitory computer readable recording medium. Examples of a non-transitory computer readable recording medium include, but are not limited to, external/removable and/or internal/built-in storage or memory units, e.g., one or more optical disks such as a DVD, a magnetic disk such as a hard disk, a semiconductor memory such as a ROM and RAM, and a memory card, and the like.

As noted above, embodiments of the system 100 include fabrication tools 108 for implementing the manufacturing processes of the system 100. For example, based on the final layout, photolithographic masks may be generated, which are used to fabricate the IC by the fabrication tools 108.

Figure 10:
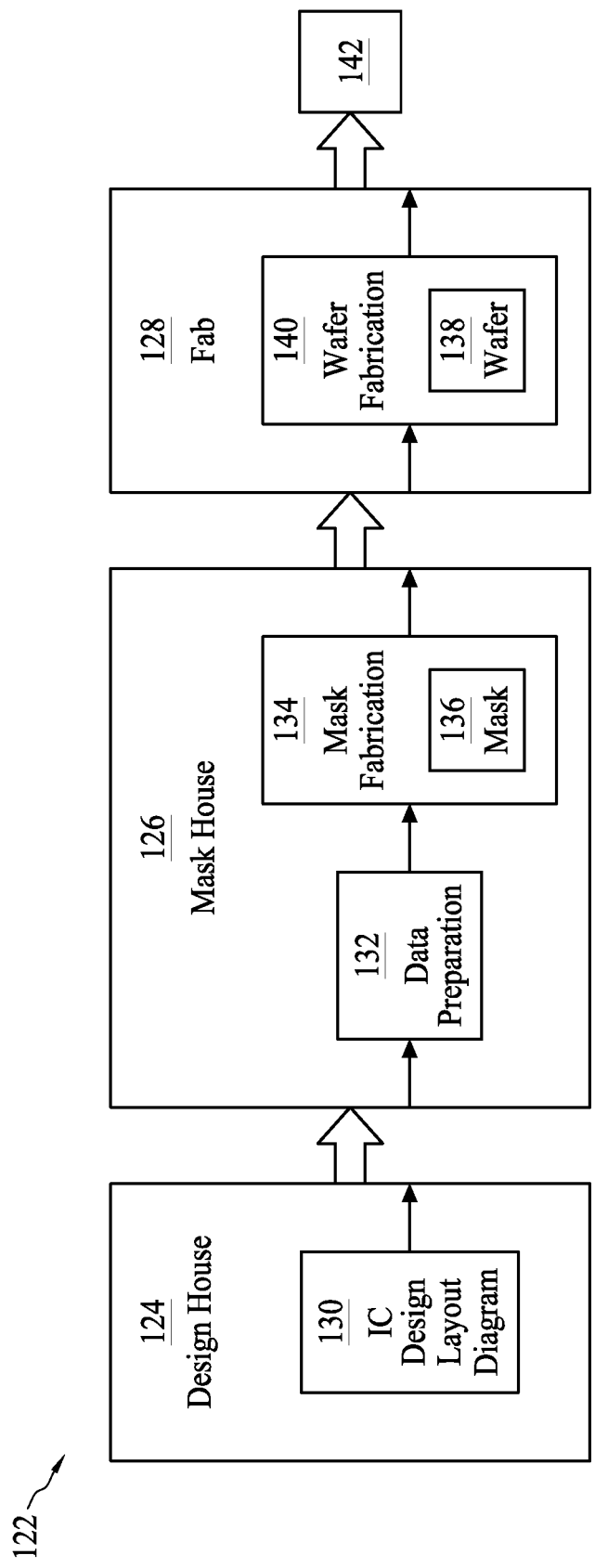
FIG. 10 is a block diagram of an IC manufacturing system and an IC manufacturing flow associated therewith, in accordance with some embodiments.

Further aspects of device fabrication are disclosed in conjunction with FIG. 10, which is a block diagram of an IC manufacturing system 122 and an IC manufacturing flow associated therewith, in accordance with some embodiments. In some embodiments, based on a layout diagram, one or more semiconductor masks and/or at least one component in a layer of a semiconductor IC is fabricated using the manufacturing system 122.

In FIG. 10, the IC manufacturing system 122 includes entities, such as a design house 124, a mask house 126, and an IC manufacturer/fabricator ("fab") 128, that interact with one another in the design, development, and manufacturing cycles and/or services related to manufacturing an IC, such as the ICs described herein. The entities in the system 122 are connected by a communications network. In some embodiments, the communications network is a single network. In some embodiments, the communications network is a variety of different networks, such as an intranet and the internet. The communications network includes wired and/or wireless communication channels. Each entity interacts with one or more of the other entities and provides services to and/or receives services from one or more of the other entities. In some embodiments, two or more of the design house 124, the mask house 126, and the IC fab 128 are owned by a single larger company. In some embodiments, two or more of the design house 124, the mask house 126, and the IC fab 128 coexist in a common facility and use common resources.

The design house (or design team) 124 generates an IC design layout diagram 130. The IC design layout diagram 130 includes various geometrical patterns, or IC layout diagrams designed for an IC device. The geometrical patterns correspond to patterns of metal, oxide, or semiconductor layers that make up the various components of the semiconductor structures to be fabricated. The various layers combine to form various IC features. For example, a portion of the IC design layout diagram 130 includes various IC features, such as diagonal vias, active areas or regions, gate electrodes, sources, drains, metal lines, local vias, and openings for bond pads, to be formed in a semiconductor substrate (such as a silicon wafer) and in various material layers disposed on the semiconductor substrate. The design house 124 implements a design procedure to form an IC design layout diagram 130. The IC design layout diagram 130 is presented in one or more data files having information of the geometrical patterns. For example, IC design layout diagram 130 can be expressed in a GDSII file format or DFII file format. In some embodiments, the design procedure includes one or more of analog circuit design, digital logic circuit design, the IDR thermal sensor 22, the temperature measurement circuit 24, place and route routines, and physical layout designs.

The mask house 126 includes data preparation 132 and mask fabrication 134. The mask house 126 uses the IC design layout diagram 130 to manufacture one or more masks 136 to be used for fabricating the various layers of the IC or semiconductor structure. The mask house 126 performs mask data preparation 132, where the IC design layout diagram 130 is translated into a representative data file (RDF). The mask data preparation 132 provides the RDF to the mask fabrication 134. The mask fabrication 134 includes a mask writer that converts the RDF to an image on a substrate, such as a mask (reticle) 136 or a semiconductor wafer 138. The design layout diagram 130 is manipulated by the mask data preparation 132 to comply with characteristics of the mask writer and/or criteria of the IC fab 128. In FIG. 10, the mask data preparation 132 and the mask fabrication 134 are illustrated as separate elements. In some embodiments, the mask data preparation 132 and the mask fabrication 134 can be collectively referred to as mask data preparation.

In some embodiments, the mask data preparation 132 includes an optical proximity correction (OPC) which uses lithography enhancement techniques to compensate for image errors, such as those that can arise from diffraction, interference, other process effects and the like. The OPC adjusts the IC design layout diagram 130. In some embodiments, the mask data preparation 132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, the mask data preparation 132 includes a mask rule checker (MRC) that checks the IC design layout diagram 130 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 130 to compensate for limitations during the mask fabrication 134, which may undo part of the modifications performed by OPC to meet mask creation rules.

In some embodiments, the mask data preparation 132 includes lithography process checking (LPC) that simulates processing that will be implemented by the IC fab 128. LPC simulates this processing based on the IC design layout diagram 130 to create a simulated manufactured device. The processing parameters in LPC simulation can include parameters associated with various processes of the IC manufacturing cycle, parameters associated with tools used for manufacturing the IC, and/or other aspects of the manufacturing process. LPC considers various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are repeated to further refine the IC design layout diagram 130.

The above description of mask data preparation 132 has been simplified for the purposes of clarity. In some embodiments, data preparation 132 includes additional features such as a logic operation (LOP) to modify the IC design layout diagram 130 according to manufacturing rules. Additionally, the processes applied to the IC design layout diagram 130 during data preparation 132 may be executed in a variety of different orders.

After the mask data preparation 132 and during the mask fabrication 134, a mask 136 or a group of masks 136 are fabricated based on the modified IC design layout diagram 130. In some embodiments, the mask fabrication 134 includes performing one or more lithographic exposures based on the IC design layout diagram 130. In some embodiments, an electron-beam (e-beam) or a mechanism of multiple e-beams is used to form a pattern on a mask (photomask or reticle) 136 based on the modified IC design layout diagram 130. The mask 136 can be formed in various technologies. In some embodiments, the mask 136 is formed using binary technology.

In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region, and transmits through the transparent regions. In one example, a binary mask version of the mask 136 includes a transparent substrate (e.g., fused quartz) and an opaque material (e.g., chromium) coated in the opaque regions of the binary mask. In another example, the mask 136 is formed using a phase shift technology. In a phase shift mask (PSM) version of the mask 136, various features in the pattern formed on the phase shift mask are configured to have proper phase difference to enhance the resolution and imaging quality. In various examples, the phase shift mask can be attenuated PSM or alternating PSM. The mask(s) generated by the mask fabrication 134 is used in a variety of processes. For example, such a mask(s) is used in an ion implantation process to form various doped regions in the semiconductor wafer 138, in an etching process to form various etching regions in the semiconductor wafer 138, and/or in other suitable processes.

The IC fab 128 includes wafer fabrication 140. The IC fab 128 is an IC fabrication business that includes one or more manufacturing facilities for the fabrication of a variety of different IC products. In some embodiments, the IC fab 128 is a semiconductor foundry. For example, there may be a manufacturing facility for the front end of line (FEOL) fabrication of a plurality of IC products, while a second manufacturing facility may provide the back end of line (BEOL) fabrication for the interconnection and packaging of the IC products, and a third manufacturing facility may provide other services for the foundry business.

The IC fab 128 uses the mask(s) 136 fabricated by the mask house 126 to fabricate the semiconductor structures or ICs 142 of the current disclosure. Thus, the IC fab 128 at least indirectly uses the IC design layout diagram 130 to fabricate the semiconductor structures or ICs 142 of the current disclosure. Also, the semiconductor wafer 138 includes a silicon substrate or other proper substrate having material layers formed thereon, and the semiconductor wafer 138 further includes one or more of various doped regions, dielectric features, multilevel interconnects, and the like (formed at subsequent manufacturing steps). In some embodiments, the semiconductor wafer 138 is fabricated by the IC fab 128 using the mask(s) 136 to form the semiconductor structures or ICs 142 of the current disclosure. In some embodiments, the IC fabrication includes performing one or more lithographic exposures based at least indirectly on the IC design layout diagram 130.

As described above, in some embodiments, IDR units are arranged in rows and columns in a device to measure a temperature of the device. Also, in some embodiments, each of the IDR units has the same number of MOSFETs connected in series to one another and, in some embodiments, at least one IDR unit has more MOSFETs connected in series to one another than other IDR units. Thermal sensors including IDR unit arrays and others are further described below with reference to the figures.

Figure 11:
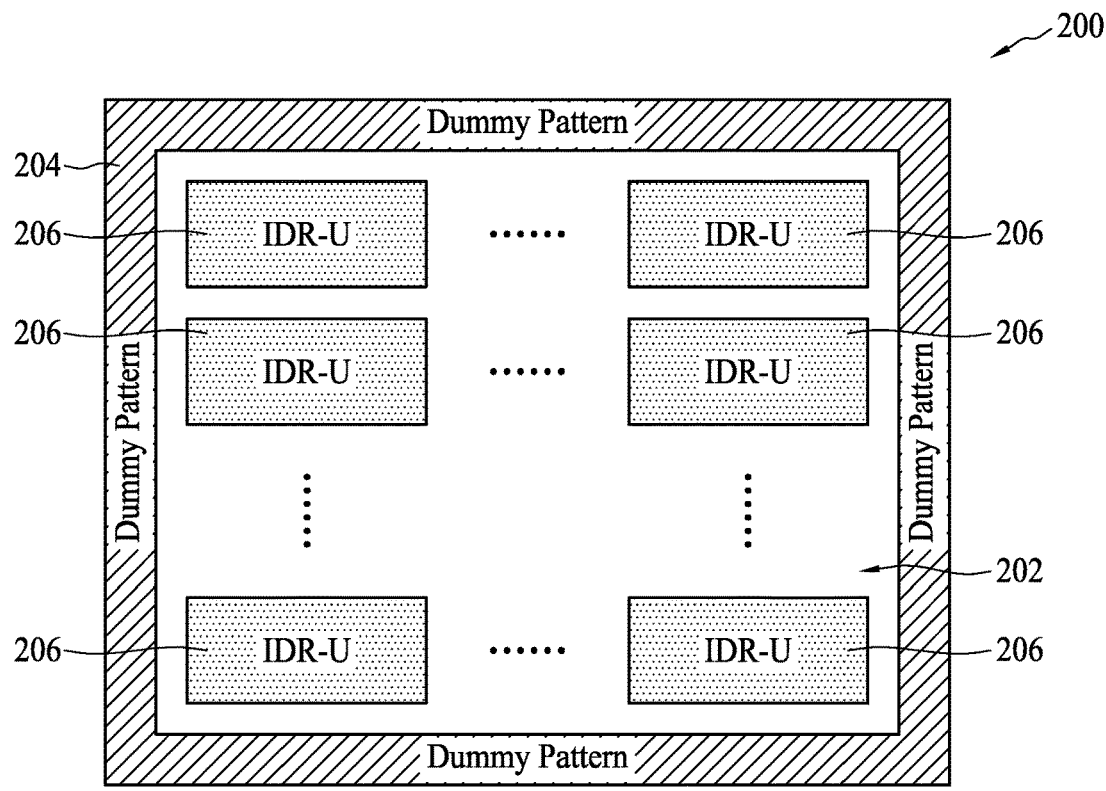
FIG. 11 is a diagram schematically illustrating a thermal sensor that includes an IDR unit array surrounded by a dummy pattern, in accordance with some embodiments.

FIG. 11 is a diagram schematically illustrating a thermal sensor 200 that includes an IDR unit array 202 surrounded by a dummy pattern 204, in accordance with some embodiments. The IDR unit array 202 includes IDR units 206 arranged in rows and columns. In some embodiments, each of the IDR units 206 is like the IDR unit 26 of FIG. 2. In some embodiments, each of the IDR units 206 is like the IDR layout 30 of FIG. 3. In some embodiments, the thermal sensor 200 is like the thermal sensor 22 (shown in FIG. 1) and, in some embodiments, the temperature measurement circuit 24 (shown in FIG. 1) is configured to determine the temperature dependent resistance of the IDR units 206 and determine the temperature of the IDR units 206, the thermal sensor 200, and/or the device 20 from the measured temperature dependent resistances.

Each of the IDR units 206 includes a separate, individual active region and a plurality of MOSFETs connected in series to one another, such that the drain/source paths of the plurality of MOSFETs are connected in series to one another. In some embodiments, each of the IDR units 206 includes the same number of MOSFETs. In other embodiments, different IDR units 206 have different numbers of MOSFETs. In some embodiments, one or more active regions of the IDR units are orientated horizontally in the device. In some embodiments, one or more active regions of the IDR units are orientated vertically in the device.

The IDR unit array 202 is surrounded by a dummy pattern 204 that can include dummy MOSFETs with dummy gates and dummy active areas. The dummy pattern 204 shape is not limited to surrounding the IDR unit array 202. In some embodiments, the dummy pattern 204 is situated on only one side of the IDR unit array 202. In some embodiments, the dummy pattern 204 is situated on two or more sides of the IDR unit array 202. In other embodiments, the DR unit array 202 is not near a dummy pattern, such as dummy pattern 204, instead the IDR unit array 202 is situated near different devices or components, such as fin field-effect transistors (finFETs), gate-all-around (GAA) transistors, silicon-on-insulator (SOI) devices, guard rings, and/or capacitors.

Figure 12:
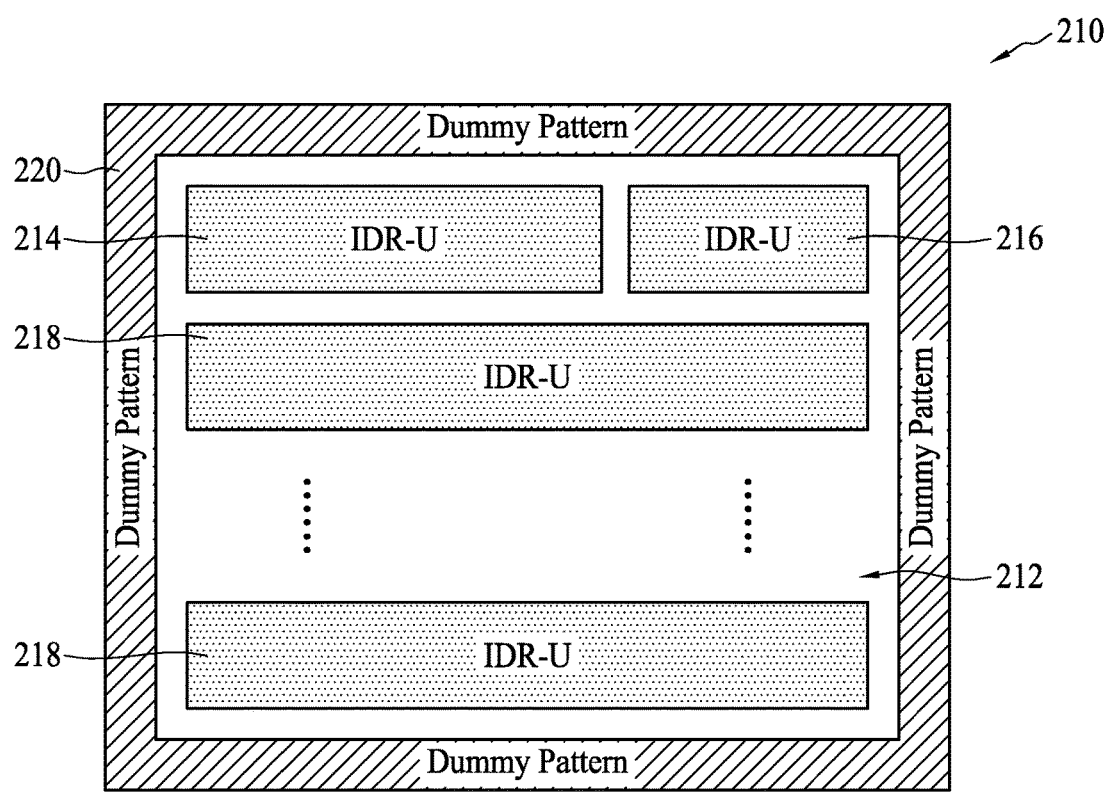
FIG. 12 is a diagram schematically illustrating a thermal sensor that includes an IDR unit array that includes three different IDR units that each have a different number of MOSFETs, in accordance with some embodiments.

FIG. 12 is a diagram schematically illustrating a thermal sensor 210 that includes an IDR unit array 212 that includes three different DR units 214, 216, and 218 that each have a different number of MOSFETs, in accordance with some embodiments. The IDR unit array 212 includes the IDR units 214, 216, and 218 surrounded by a dummy pattern 220. In some embodiments, one or more of the IDR units 214, 216, and 218 is like the IDR unit 26 of FIG. 2. In some embodiments, one or more of the IDR units 214, 216, and 218 is like the IDR layout 30 of FIG. 3. In some embodiments, the thermal sensor 210 is like the thermal sensor 22 (shown in FIG. 1) and, in some embodiments, the temperature measurement circuit 24 (shown in FIG. 1) is configured to determine the temperature dependent resistance of the IDR units 214, 216, and 218 and to determine the temperature of the IDR units 214, 216, and 218, the thermal sensor 210, and/or the device 20 from the measured temperature dependent resistances.

Each of the IDR units 214, 216, and 218 includes a separate, individual active region and a plurality of MOSFETs connected in series to one another, such that the drain/source paths of the plurality of MOSFETs are connected in series to one another. The IDR unit 218 includes the largest number of series connected MOSFETs and extends from one side of the IDR unit array 212 next to the dummy pattern 220 to the other side of the IDR unit array 212 next to the dummy pattern 220. The IDR unit 216 includes the smallest number of series connected MOSFETs, and the IDR unit 214 includes more series connected MOSFETs than the IDR unit 216 and fewer series connected MOSFETs than the IDR unit 218. In other embodiments, the thermal sensor 210 includes only a plurality of the IDR units 218 that extend from one side of the IDR unit array 212 next to the dummy pattern 220 to the other side of the IDR unit array 212 next to the dummy pattern 220. In some embodiments, one or more active regions of the IDR units are orientated horizontally in the device. In some embodiments, one or more active regions of the IDR units are orientated vertically in the device.

The DR unit array 212 is surrounded by the dummy pattern 220 that can include dummy MOSFETs with dummy gates and dummy active areas. The dummy pattern 220 shape is not limited to surrounding the DR unit array 212. In some embodiments, the dummy pattern 220 is situated on only one side of the DR unit array 212. In some embodiments, the dummy pattern 220 is situated on two or more sides of the IDR unit array 212. In other embodiments, the DR unit array 212 is not next to a dummy pattern, such as dummy pattern 220, instead the DR unit array 212 is situated near different devices or components, such as finFETs, GAA transistors, SIO devices, guard rings, and/or capacitors.

Figure 13:
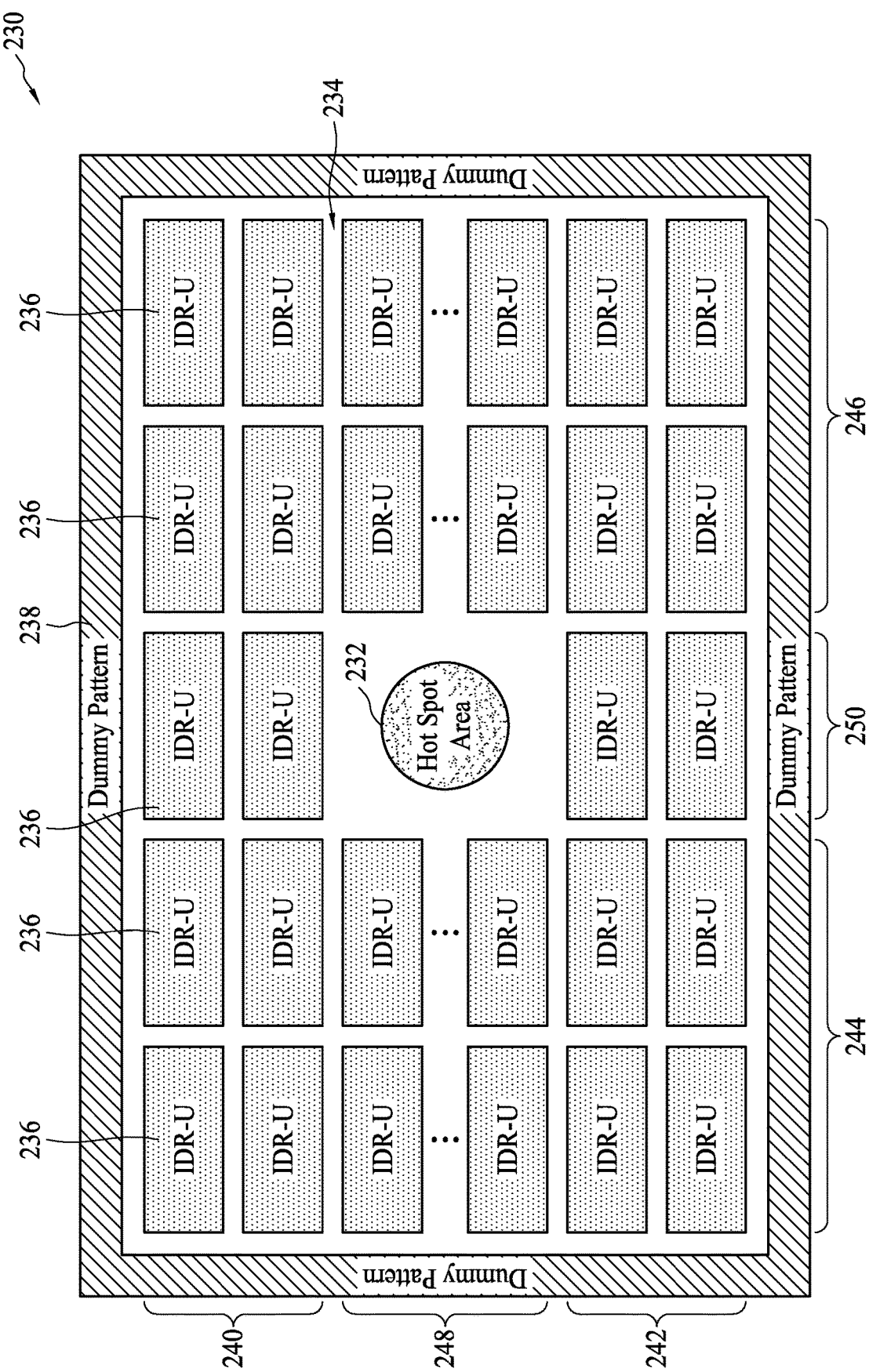
FIG. 13 is a diagram schematically illustrating a thermal sensor configured to measure the temperature of a hot spot area in a device, in accordance with some embodiments.

FIG. 13 is a diagram schematically illustrating a thermal sensor 230 configured to measure the temperature of a hot spot area 232 in a device, such as the semiconductor device 20 of FIG. 1, in accordance with some embodiments. The thermal sensor 230 includes an IDR unit array 234 that includes IDR units 236 arranged in rows and columns next to and/or around the hot spot area 232 to measure the temperature of the hot spot area 232. The IDR unit array 234, including the IDR units 236, is surrounded by a dummy pattern 238. In some embodiments, each of the IDR units 236 is like the IDR unit 26 of FIG. 2. In some embodiments, each of the IDR units 236 is like the IDR layout 30 of FIG. 3. In some embodiments, the thermal sensor 230 is like the thermal sensor 22 (shown in FIG. 1) and, in some embodiments, the temperature measurement circuit 24 (shown in FIG. 1) is configured to determine the temperature dependent resistance of the IDR units 236 and determine the temperature of the IDR units 236, the thermal sensor 230, and/or the device 20 from the measured temperature dependent resistances.

Each of the IDR units 236 includes a separate, individual active region and a plurality of MOSFETs connected in series to one another, such that the drain/source paths of the plurality of MOSFETs are connected in series to one another. In some embodiments, each of the IDR units 236 includes the same number of MOSFETs. In other embodiments, different IDR units 236 have different numbers of MOSFETs. In some embodiments, one or more active regions of the IDR units are orientated horizontally in the device. In some embodiments, one or more active regions of the IDR units are orientated vertically in the device.

The IDR unit array 234 includes the DR units 236 arranged in rows and columns next to and/or around the hot spot area 232. The IDR unit array 234 include two rows 240 of IDR units 236 above the hot spot area 232 and two rows 242 of IDR units 236 below the hot spot area 232. Also, the IDR unit array 234 includes two columns 244 of IDR units 236 on one side of the hot spot area 232 and two columns 246 of IDR units 236 on the other side of the hot spot area 232. In some embodiments, the IDR unit array 234 includes at least one row 248 of IDR units 236 in line with the hot spot area 232 and, in some embodiments, at least one column 250 of IDR units 236 in line with the hot spot area 232.

In other embodiments, the IDR unit array 234 includes less than two rows 240 of IDR units 236, down to zero rows 240 of IDR units 236, above the hot spot area 232 or greater than two rows 240 of IDR units 236 above the hot spot area 232. In other embodiments, the IDR unit array 234 includes less than two rows 242 of IDR units 236, down to zero rows 242 of IDR units 236, below the hot spot area 232 or greater than two rows 242 of IDR units 236 below the hot spot area 232. Also, in other embodiments, the IDR unit array 234 includes less than two columns 244 of IDR units 236, down to zero columns 244 of IDR units 236, on the one side of the hot spot area 232 or greater than two columns 244 of IDR units 236 on the one side of the hot spot area 232 and, in other embodiments, the IDR unit array 234 includes less than two columns 246 of IDR units 236, down to zero columns 246 of IDR units 236, on the other side of the hot spot area 232 or greater than two columns 246 of IDR units 236 on the other side of the hot spot area 232.

The IDR unit array 234 is surrounded by a dummy pattern 238 that can include dummy MOSFETs with dummy gates and dummy active areas. The dummy pattern 238 shape is not limited to surrounding the IDR unit array 234. In some embodiments, the dummy pattern 238 is situated on only one side of the IDR unit array 234. In some embodiments, the dummy pattern 238 is situated on two or more sides of the IDR unit array 234. In other embodiments, the IDR unit array 234 is not near a dummy pattern, such as dummy pattern 238, instead the IDR unit array 234 is situated near different devices or components, such as finFETs, GAA transistors, SIO devices, guard rings, and/or capacitors.

Figure 14:
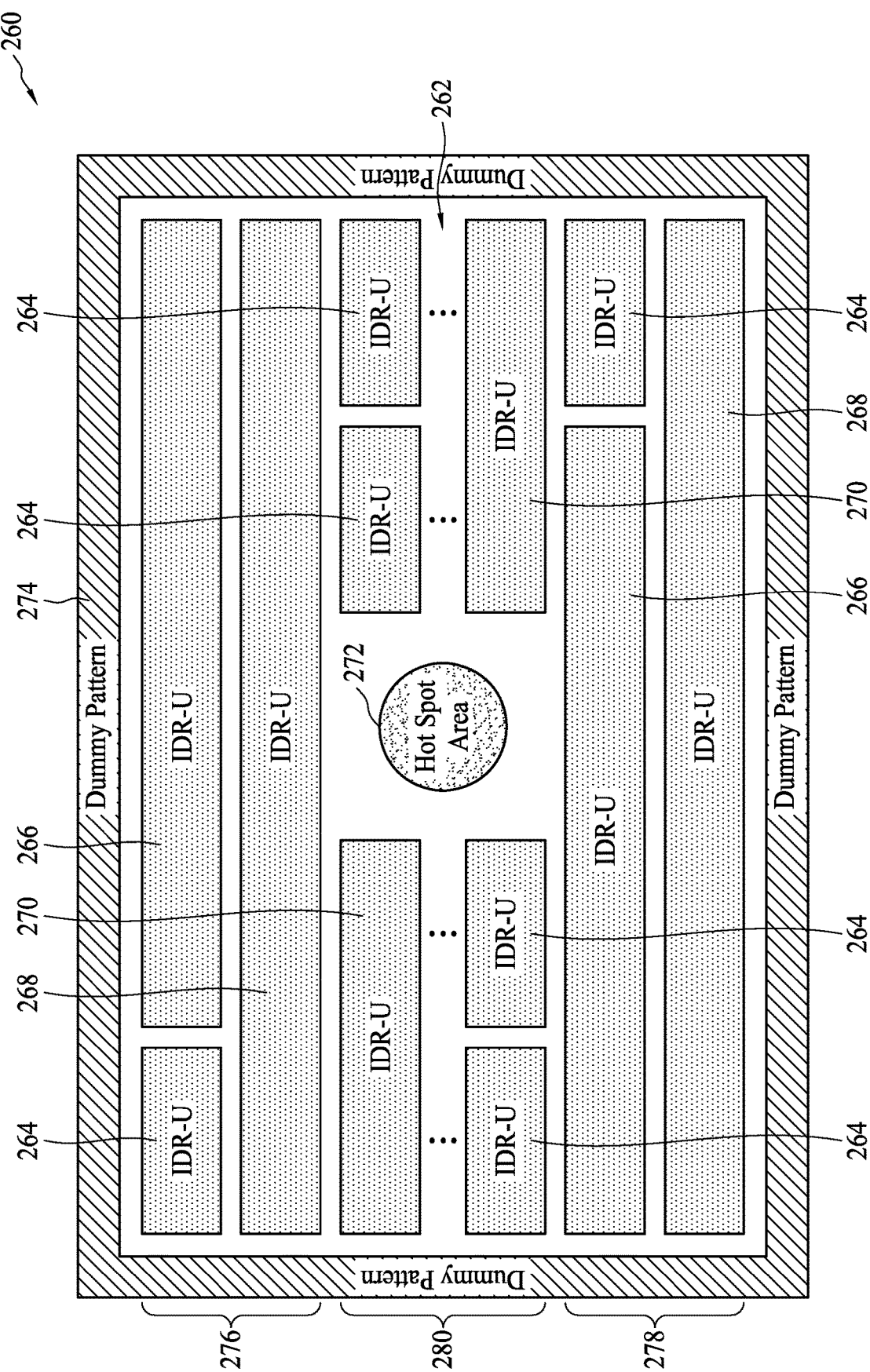
FIG. 14 is a diagram schematically illustrating a thermal sensor that includes an IDR unit array that includes four different DR units configured to measure the temperature of a hot spot area in a device, in accordance with some embodiments.

FIG. 14 is a diagram schematically illustrating a thermal sensor 260 that includes an IDR unit array 262 that includes four different IDR units 264, 266, 268, and 270 configured to measure the temperature of a hot spot area 272 in a device, such as the semiconductor device 20 of FIG. 1, in accordance with some embodiments. The four different IDR units 264, 266, 268, and 270 each have a different number of MOSFETs. The thermal sensor 260 includes the IDR units 264, 266, 268, and 270 arranged in rows next to and/or around the hot spot area 272 to measure the temperature of the hot spot area 272. The IDR unit array 262 includes the IDR units 264, 266, 268, and 270 surrounded by a dummy pattern 274.

In some embodiments, one or more of the IDR units 264, 266, 268, and 270 is like the IDR unit 26 of FIG. 2. In some embodiments, one or more of the IDR units 264, 266, 268, and 270 is like the IDR layout 30 of FIG. 3. In some embodiments, the thermal sensor 260 is like the thermal sensor 22 (shown in FIG. 1) and, in some embodiments, the temperature measurement circuit 24 (shown in FIG. 1) is configured to determine the temperature dependent resistance of the IDR units 264, 266, 268, and 270 and to determine the temperature of the IDR units 264, 266, 268, and 270, the thermal sensor 260, and/or the device 20 from the measured temperature dependent resistances.

Each of the IDR units 264, 266, 268, and 270 includes a separate, individual active region and a plurality of MOSFETs connected in series to one another, such that the drain/source paths of the plurality of MOSFETs are connected in series to one another. The IDR unit 268 includes the largest number of series connected MOSFETs and extends from one side of the IDR unit array 262 next to the dummy pattern 274 to the other side of the IDR unit array 262 next to the dummy pattern 274. The IDR unit 266 includes the next largest number of series connected MOSFETs and the IDR unit 270 includes the third largest number of series connected MOSFETs. The IDR unit 264 includes the smallest number of series connected MOSFETs. In other embodiments, the thermal sensor 260 includes only a plurality of the IDR units 268 that extend from one side of the IDR unit array 262 next to the dummy pattern 274 to the other side of the IDR unit array 262 next to the dummy pattern 274. In some embodiments, one or more active regions of the DR units are orientated horizontally in the device. In some embodiments, one or more active regions of the DR units are orientated vertically in the device.

The IDR unit array 262 includes the IDR units 264, 266, 268, and 270 arranged in rows next to and/or around the hot spot area 272. The IDR unit array 262 include two rows 276 of IDR units, such as IDR units 264, 266, 268, and 270, above the hot spot area 272 and two rows 278 of IDR units, such as IDR units 264, 266, 268, and 270 below the hot spot area 272. In some embodiments, the IDR unit array 262 includes at least one row 280 of IDR units, such as IDR units 264, 266, 268, and 270, in line with the hot spot area 272.

In other embodiments, the IDR unit array 262 includes less than two rows 276 of IDR units 264, 266, 268, and 270, down to zero rows 276 of IDR units 264, 266, 268, and 270, above the hot spot area 272 or greater than two rows 276 of IDR units 264, 266, 268, and 270 above the hot spot area 272. In other embodiments, the IDR unit array 262 includes less than two rows 278 of IDR units 264, 266, 268, and 270, down to zero rows 278 of IDR units 264, 266, 268, and 270, below the hot spot area 272 or greater than two rows 278 of IDR units 264, 266, 268, and 270 below the hot spot area 272.

The IDR unit array 262 is surrounded by the dummy pattern 274 that can include dummy MOSFETs with dummy gates and dummy active areas. The dummy pattern 274 shape is not limited to surrounding the IDR unit array 262. In some embodiments, the dummy pattern 274 is situated on only one side of the IDR unit array 262. In some embodiments, the dummy pattern 274 is situated on two or more sides of the IDR unit array 262. In other embodiments, the IDR unit array 262 is not next to a dummy pattern, such as dummy pattern 274, instead the IDR unit array 262 is situated near different devices or components, such as finFETs, GAA transistors, SIO devices, guard rings, and/or capacitors.

As disclosed above, in some embodiments, a differential voltage and/or resistance can be measured between different IDR units to measure a temperature of the device. This differential measurement is a temperature dependent differential voltage and/or resistance measurement. In some embodiments, for the differential measurement, one or more IDR resistances are measured through one or more IDR units in any of the embodiments disclosed herein. In some embodiments, for the differential measurement, one or more IDR resistances are measured through one or more parallel connected combinations of multiple series connected MOSFET circuits to measure the temperature of the device.

Figure 15:
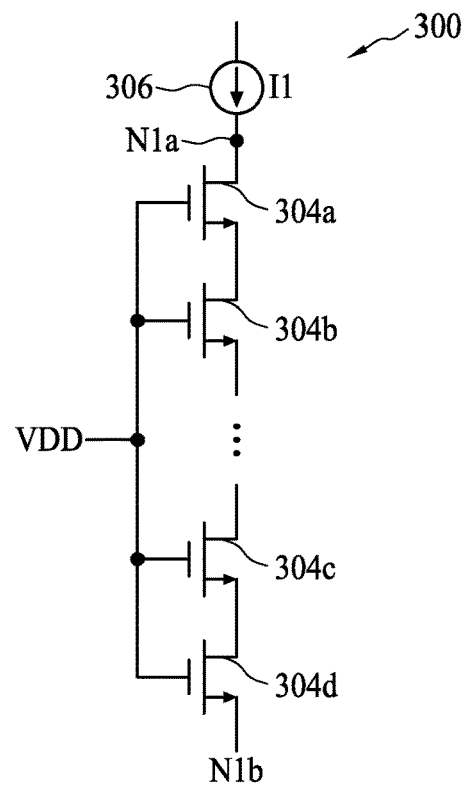
FIG. 15 is a diagram schematically illustrating a first IDR unit that includes a plurality of MOSFETs connected in series to one another, in accordance with some embodiments.
Figure 16:
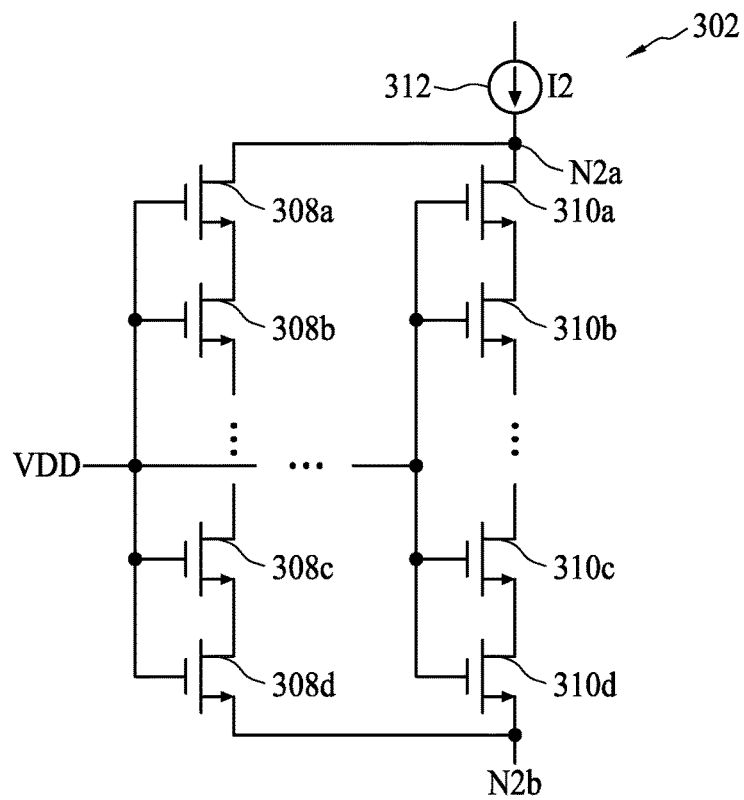
FIG. 16 is a diagram schematically illustrating a second DR unit that includes a parallel connected combination of multiple series connected MOSFET circuits, in accordance with some embodiments.

FIGS. 15 and 16 are diagrams schematically illustrating a first IDR unit 300 and a second IDR unit 302 configured to be used in a differential measurement scheme to determine the temperature of a device, such as the semiconductor device 20 of FIG. 1, in accordance with some embodiments.

FIG. 15 is a diagram schematically illustrating the first IDR unit 300 that includes a plurality of MOSFETs 304a-304d connected in series to one another, in accordance with some embodiments. The MOSFETs 304a-304d are NMOS transistors. In other embodiments, the MOSFETs 304a-304d can be PMOS transistors. In some embodiments, the first IDR unit 300 is like the IDR unit 26 of FIG. 2. In some embodiments, the first IDR unit 300 is part of the IDR thermal sensor 22 (shown in FIG. 1).

Each of the MOSFETs 304a-304d includes a gate structure, a first drain/source region on one side of the gate structure, and a second drain/source region on the other side of the gate structure. The MOSFETs 304a-304d are electrically connected in series, such that the second drain/source region of one MOSFET is electrically connected to the first drain/source region of the next MOSFET to connect the drain/source paths of the MOSFETs 304a-304d in series with one another.

The first drain/source region of MOSFET 304a is electrically connected to a current source 306 to receive a current I1 at N1a, and the second drain/source region of MOSFET 304a is electrically connected to the first drain/source region of MOSFET 304b. The second drain/source region of MOSFET 304b is electrically connected to the first drain/source region of the next MOSFET in line, down to MOSFET 304c. Where, the second drain/source region of MOSFET 304c is electrically connected to the first drain/source region of MOSFET 304d, and the second drain/source region of MOSFET 304d is electrically connected to a reference, such as ground, at N1b.

The gate structures of the MOSFETs 304a-304d are electrically connected to one another and to a voltage VDD that biases on the NMOS MOSFETs 304a-304d. This provides a temperature dependent inversion diffusivity resistance R1 through the NMOS MOSFETs 304a-304d from N1a to N1b. The temperature dependent inversion diffusivity resistance R1 of the first IDR unit 300 is used in the differential measurement scheme, further described below, to measure the temperature of the device, such as the temperature near a hot spot in the device. In other embodiments, the MOSFETs 304a-304d can be PMOS MOSFETs, such that a low reference voltage, such as ground, is provided to the gate structures of the MOSFETs 304a-304d to bias on the MOSFETs 304a-304d and provide the temperature dependent inversion diffusivity resistance R1 through the MOSFETs 304a-304d from N1a to N1b.

The series connected MOSFETs 304a-304d provide the inversion diffusivity resistance R1 that is dependent on the number of MOSFETs 304a-304d connected in series and on the temperature of the first IDR unit 300. Connecting more MOSFETs in series, increases the resistance through the series connected MOSFETs 304a-304d. In some embodiments, the current I1 is a constant current provided at N1a and the voltage from N1a to N1b is measured to determine the resistance R1 through the first IDR unit 300. The measured resistance R1 is used to determine the temperature of the device.

FIG. 16 is a diagram schematically illustrating the second IDR unit 302 that includes a parallel connected combination of multiple series connected MOSFET circuits, in accordance with some embodiments. The second IDR unit 302 includes a first plurality of MOSFETs 308a-308d connected in series to one another and a second plurality of MOSFETs 310a-310d connected in series to one another. The first plurality of MOSFETs 308a-308d is connected in parallel with the second plurality of MOSFETs 310a-310d, where the first plurality of MOSFETs 308a-308d is connected to the second plurality of MOSFETs 310a-310d at one node N2a and at another node N2b. The MOSFETs 308a-308d and 310a-310d are NMOS transistors. In some embodiments, the second IDR unit 302 includes more than two series connected MOSFET circuits. In other embodiments, the MOSFETs 308a-308d and 310a-310d are PMOS transistors. In some embodiments, the second IDR unit 302 is part of the IDR thermal sensor 22 (shown in FIG. 1).

Each of the MOSFETs 308a-308d includes a gate structure, a first drain/source region on one side of the gate structure, and a second drain/source region on the other side of the gate structure. The MOSFETs 308a-308d are electrically connected in series, such that the second drain/source region of one MOSFET is electrically connected to the first drain/source region of the next MOSFET to connect the drain/source paths of the MOSFETs 308a-308d in series with one another.

The first drain/source region of MOSFET 308a is electrically connected to a current source 312 that provides a current I2 at N2a, and the second drain/source region of MOSFET 308a is electrically connected to the first drain/source region of MOSFET 308b. The second drain/source region of MOSFET 308b is electrically connected to the first drain/source region of the next MOSFET in line, down to MOSFET 308c. Where, the second drain/source region of MOSFET 308c is electrically connected to the first drain/source region of MOSFET 308d, and the second drain/source region of MOSFET 308d is electrically connected to a reference, such as ground, at N2b. In some embodiments, the value of current I1 from the current source 306 is the same as the value of current I2 from the current source 312.

Each of the MOSFETs 310a-310d includes a gate structure, a first drain/source region on one side of the gate structure, and a second drain/source region on the other side of the gate structure. The MOSFETs 310a-310d are electrically connected in series, such that the second drain/source region of one MOSFET is electrically connected to the first drain/source region of the next MOSFET to connect the drain/source paths of the MOSFETs 310a-310d in series with one another.

The first drain/source region of MOSFET 310a is electrically connected to the current source 312 that provides the current I2 at N2a, and the second drain/source region of MOSFET 310a is electrically connected to the first drain/source region of MOSFET 310b. The second drain/source region of MOSFET 310b is electrically connected to the first drain/source region of the next MOSFET in line, down to MOSFET 310c. Where, the second drain/source region of MOSFET 310c is electrically connected to the first drain/source region of MOSFET 310d, and the second drain/source region of MOSFET 310d is electrically connected to a reference, such as ground, at N2b.

The gate structures of the MOSFETs 308a-308d and 310a-310d are electrically connected to one another and to a voltage VDD that biases on the NMOS MOSFETs 308a-308d and 310a-310d. This provides a temperature dependent inversion diffusivity resistance R2 through the NMOS MOSFETs 308a-308d and 310a-310d from N2a to N2b. The temperature dependent inversion diffusivity resistance R2 of the second IDR unit 302 is used in the differential measurement scheme, further described below, to measure the temperature of the device, such as the temperature near a hot spot in the device. In other embodiments, the MOSFETs 308a-308d and 310a-310d can be PMOS MOSFETs, such that a low reference voltage, such as ground, is provided to the gate structures of the MOSFETs 308a-308d and 310a-310d to bias on the MOSFETs 308a-308d and 310a-310d and provide the temperature dependent inversion diffusivity resistance R2 through the MOSFETs 308a-308d and 310a-310d from N2a to N2b.

The second IDR unit 302 provides the inversion diffusivity resistance R2 that is dependent on the following: the number of parallel connected MOSFET circuits; the number of series connected MOSFETs 308a-308d and 310a-310d in each MOSFET circuit, and the temperature of the second IDR unit 302. Connecting more MOSFET circuits in parallel reduces the resistance R2 and connecting more MOSFETs in series increases the resistance R2. In some embodiments, the current I2 is a constant current provided at N2a and the voltage from N2a to N2b is measured to determine the resistance R2 through the second IDR unit 302. The measured resistance R2 is used to determine the temperature of the device.

In the differential measurement scheme, assuming the IDRs R1 and R2:

$$(R1+\Delta_{R1})(1+TC1 \times dt)=(R1)(1+TC1 \times dt)+(\Delta_{R1})(1+TC1 \times dt), \text{ and}$$

$$(R2+\Delta_{R2})(1+TC1 \times dt)=(R2)(1+TC1 \times dt)+(\Delta_{R2})(1+TC1 \times dt),$$

where $\Delta_{R1}$ is a change in the resistance R1, $\Delta_{R2}$ is a change in the resistance R2, TC1 is a temperature coupling coefficient, and dt is a change in time. If a current I is the same as the current I1 through the resistance R1 and the same as the current I2 through the resistance R2, then the differential voltage dV is:

$$dV=I \times \{(R2-R1)(1+TC1 \times dt)+(\Delta_{R2}-\Delta_{R1})(1+TC1 \times dt)\}.$$

Also, if both resistances R1 and R2 are tracking, then $(\Delta_{R2}-\Delta_{R1})=0$, and the differential voltage dV is process dependent.

Figure 17:
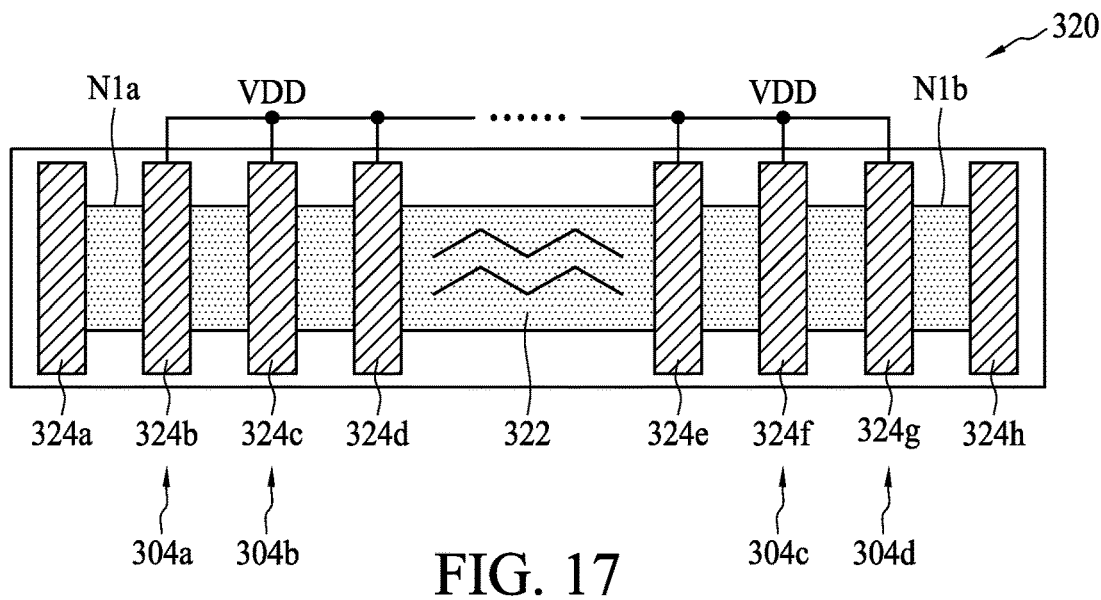
FIG. 17 is a diagram schematically illustrating a first IDR layout of the first IDR unit of FIG. 15, in accordance with some embodiments.

FIG. 17 is a diagram schematically illustrating a first IDR layout 320 of the first IDR unit 300 of FIG. 15, in accordance with some embodiments. The first IDR layout 320 includes an active region 322 and gate structures 324a-324h situated across the active region 322. In some embodiments, the first IDR layout 320 is at least part of the IDR thermal sensor 22 (shown in FIG. 1).

The gate structures 324a-324h include the gate structures of the MOSFETs 304a-304d of the first IDR unit 300. Each of the gate structures 324*b*-324*g* corresponds to an NMOS transistor in the first IDR unit 300, where the gate structures 324*b*, 324*c*, 324*f*, and 324*g* correspond to the MOSFETs 304*a*, 304*b*, 304*c*, and 304*d*, respectively.

The drain/source region on one side of the gate structure 324*b* corresponds to the first drain/source region of MOSFET 304*a* and is electrically connected to receive a current and/or a voltage at N1*a*. The drain/source region on the other side of the gate structure 324*b* corresponds to the second drain/source region of the MOSFET 304*a* and to the first drain/source region of MOSFET 304*b* on one side of the gate structure 324*c*. The drain/source region on the other side of the gate structure 324*c* corresponds to the second drain/source region of the MOSFET 304*b* and to the first drain/source region of the next in line MOSFET on one side of the gate structure 324*d*. The drain/source region on the other side of the gate structure 324*d* corresponds to the second drain/source region of the next in line MOSFET. This continues to the drain/source region on one side of the gate structure 324*e* and the drain/source region on the other side of the gate structure 324*e* that corresponds to the first drain/source region of the MOSFET 304*c* on one side of the gate structure 324*f*. The drain/source region on the other side of the gate structure 324*f* corresponds to the second drain/source region of the MOSFET 304*c* and to the first drain/source region of the MOSFET 304*d* on one side of the gate structure 324*g*. The other side of the gate structure 324*g* corresponds to the second drain/source region of the MOSFET 304*d* and is electrically connected to a reference, such as ground, at N1*b*.

The gate structures 324*b*-324*g* are connected to one another and to VDD to bias on the corresponding NMOS transistors and provide a temperature dependent inversion diffusivity resistance R1 through the first IDR layout 320 from N1*a* to N1*b*. In some embodiments, the gate structures 324*a* and 324*h* are dummy gate structures.

Figure 18:
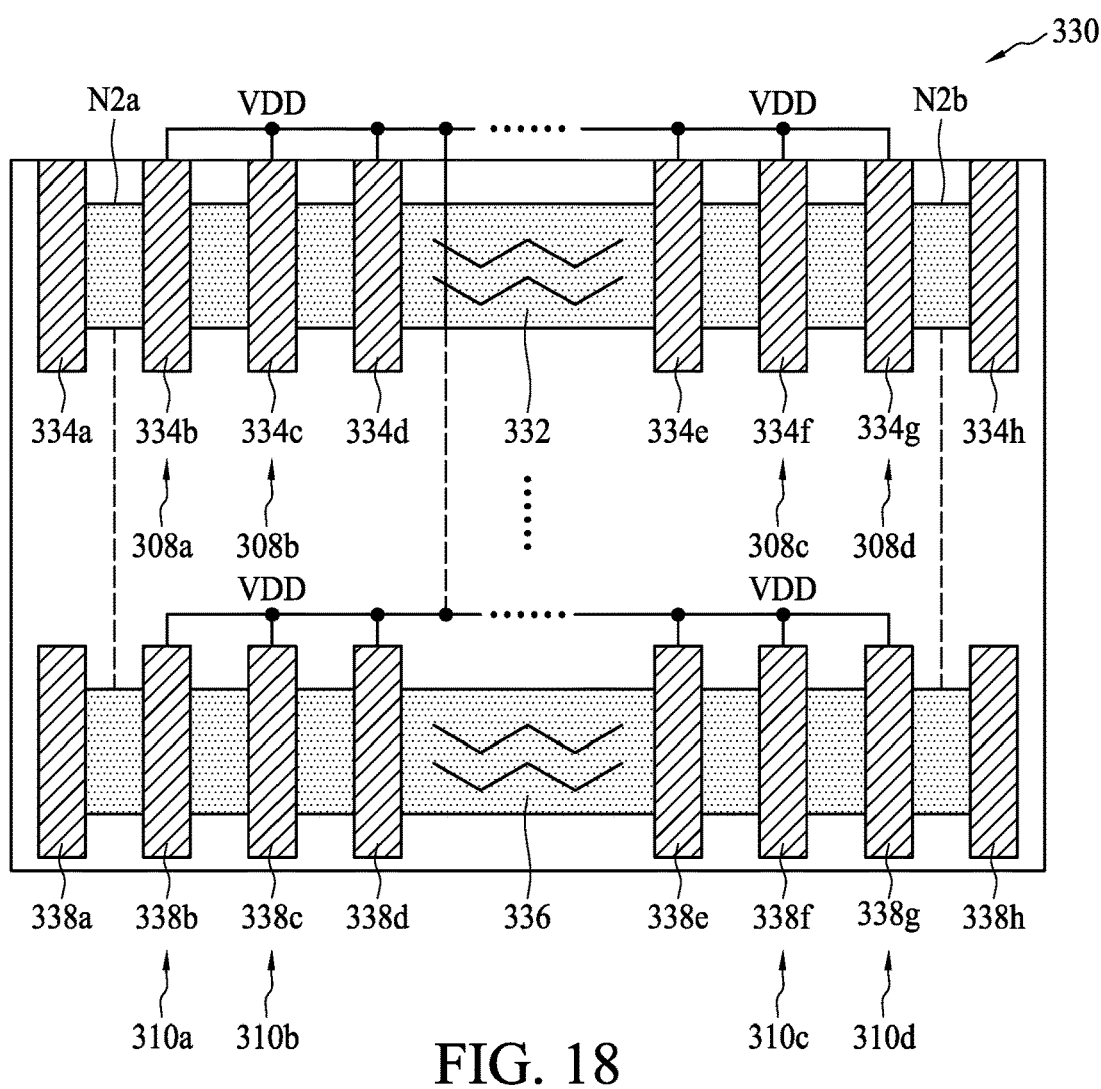
FIG. 18 is a diagram schematically illustrating a second IDR layout of the second IDR unit of FIG. 16, in accordance with some embodiments.

FIG. 18 is a diagram schematically illustrating a second IDR layout 330 of the second IDR unit 302 of FIG. 16, in accordance with some embodiments. The second DR layout 330 includes multiple active regions and gate structures, including a first active region 332 and first gate structures 334*a*-334*h* situated across the first active region 332, and a second active region 336 and second gate structures 338*a*-338*h* situated across the second active region 336. In some embodiments, the second IDR layout 330 is at least part of the IDR thermal sensor 22 (shown in FIG. 1).

The gate structures 334*a*-334*h* include the gate structures of the MOSFETs 308*a*-308*d* of the second IDR unit 302. Each of the gate structures 334*b*-334*g* corresponds to an NMOS transistor in the second IDR unit 302, where the gate structures 334*b*, 334*c*, 334*f*, and 334*g* correspond to the MOSFETs 308*a*, 308*b*, 308*c*, and 308*d*, respectively.

The drain/source region on one side of the gate structure 334*b* corresponds to the first drain/source region of MOSFET 308*a* and is electrically connected to receive a current and/or a voltage at N2*a*. The drain/source region on the other side of the gate structure 334*b* corresponds to the second drain/source region of the MOSFET 308*a* and to the first drain/source region of MOSFET 308*b* on one side of the gate structure 334*c*. The drain/source region on the other side of the gate structure 334*c* corresponds to the second drain/source region of the MOSFET 308*b* and to the first drain/source region of the next in line MOSFET on one side of the gate structure 334*d*. The drain/source region on the other side of the gate structure 334*d* corresponds to the second drain/source region of the next in line MOSFET. This continues to the drain/source region on one side of the gate structure 334*e* and the drain/source region on the other side of the gate structure 334*e* that corresponds to the first drain/source region of the MOSFET 308*c* on one side of the gate structure 334*f*. The drain/source region on the other side of the gate structure 334*f* corresponds to the second drain/source region of the MOSFET 308*c* and to the first drain/source region of the MOSFET 308*d* on one side of the gate structure 334*g*. The other side of the gate structure 334*g* corresponds to the second drain/source region of the MOSFET 308*d* and is electrically connected to a reference, such as ground, at N2*b*.

The gate structures 338*a*-338*h* include the gate structures of the MOSFETs 310*a*-310*d* of the second IDR unit 302. Each of the gate structures 338*b*-338*g* corresponds to an NMOS transistor in the second IDR unit 302, where the gate structures 338*b*, 338*c*, 338*f*, and 338*g* correspond to the MOSFETs 310*a*, 310*b*, 310*c*, and 310*d*, respectively.

The drain/source region on one side of the gate structure 338*b* corresponds to the first drain/source region of MOSFET 310*a* and is electrically connected to receive a current and/or a voltage at N2*a*. The drain/source region on the other side of the gate structure 338*b* corresponds to the second drain/source region of the MOSFET 310*a* and to the first drain/source region of MOSFET 310*b* on one side of the gate structure 338*c*. The drain/source region on the other side of the gate structure 338*c* corresponds to the second drain/source region of the MOSFET 310*b* and to the first drain/source region of the next in line MOSFET on one side of the gate structure 338*d*. The drain/source region on the other side of the gate structure 338*d* corresponds to the second drain/source region of the next in line MOSFET. This continues to the drain/source region on one side of the gate structure 338*e* and the drain/source region on the other side of the gate structure 338*e* that corresponds to the first drain/source region of the MOSFET 310*c* on one side of the gate structure 338*f*. The drain/source region on the other side of the gate structure 338*f* corresponds to the second drain/source region of the MOSFET 310*c* and to the first drain/source region of the MOSFET 310*d* on one side of the gate structure 338*g*. The other side of the gate structure 338*g* corresponds to the second drain/source region of the MOSFET 310*d* and is electrically connected to a reference, such as ground, at N2*b*.

The gate structures 334*b*-334*g* and the gate structures 338*b*-338*g* are connected to one another and to VDD to bias on the corresponding NMOS transistors and provide a temperature dependent inversion diffusivity resistance R2 through the second IDR layout 330 from N2*a* to N2*b*. In some embodiments, the gate structures 334*a*, 334*h*, 338*a*, and 338*h* are dummy gate structures.

Figure 19:
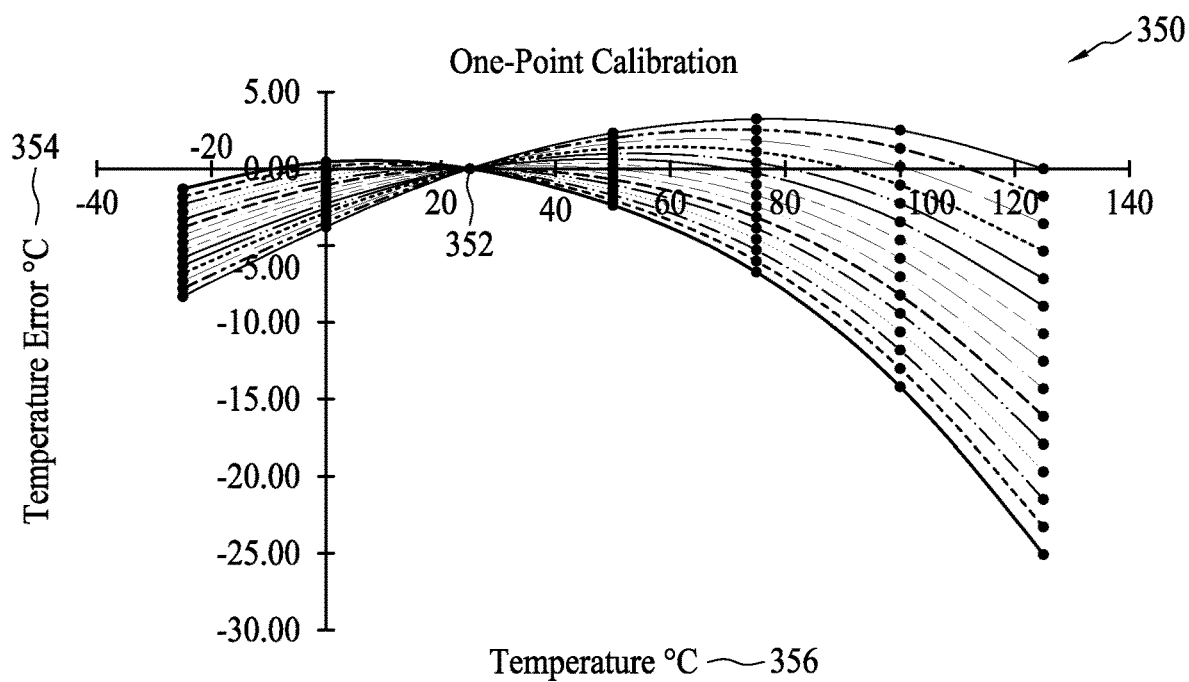
FIG. 19 is a diagram schematically illustrating a graph of the error in measuring temperature using the inversion diffusivity resistance R1 of first IDR unit and first IDR layout, in accordance with some embodiments.

FIG. 19 is a diagram schematically illustrating a graph 350 of the error in measuring temperature using the inversion diffusivity resistance R1 of first IDR unit 300 and first IDR layout 320, in accordance with some embodiments. The graph 350 is calibrated at one calibration point 352 at about 25° C. The graph 350 displays the temperature error in ° C. on the y-axis 354 versus the temperature in ° C. on the x-axis 356.

Using R1 and one-point calibration results in a temperature error of between −10° C. and about −1° C. at −25° C. and between about −26° C. and 0° C. at 125° C. The error is about +/−5° C. at −25° C. and about +/−12° C. at 125° C.

Figure 20:
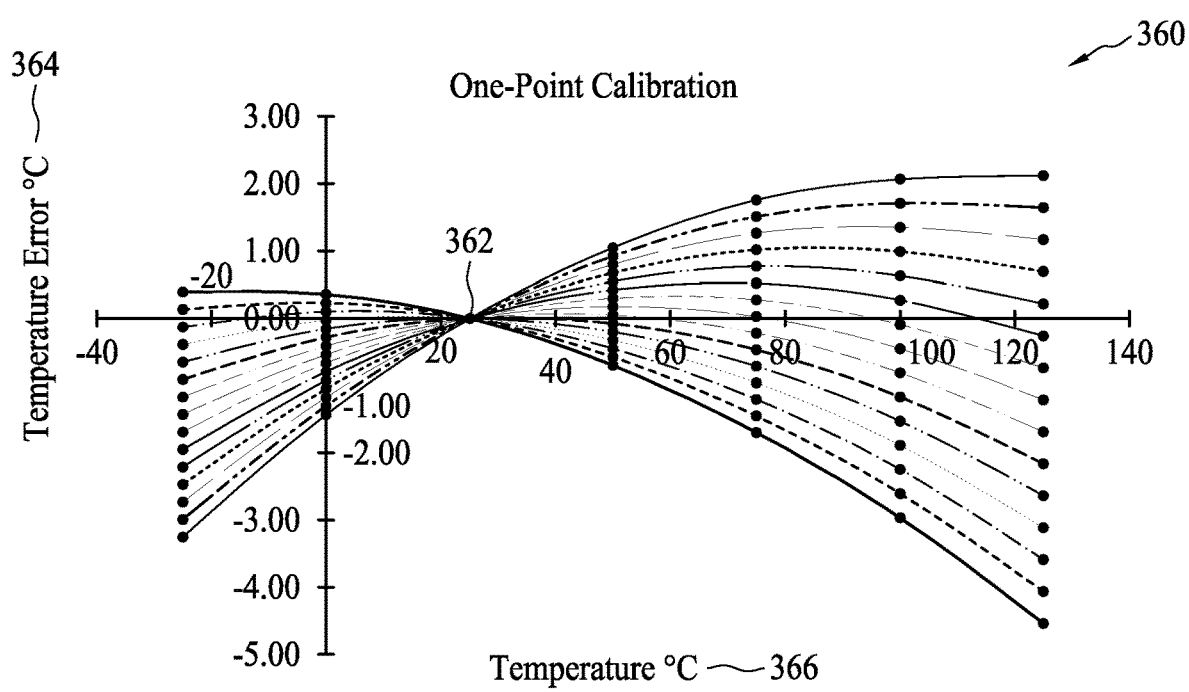
FIG. 20 is a diagram schematically illustrating a graph of the error in measuring temperature using the differential voltage (dV) between the first IDR unit and the second IDR unit and between the first IDR layout and the second IDR layout, in accordance with some embodiments.

FIG. 20 is a diagram schematically illustrating a graph 360 of the error in measuring temperature using the differential voltage (dV) between the first IDR unit 300 and the second IDR unit 302 and between the first IDR layout 320 and the second IDR layout 330, in accordance with some embodiments. The graph 360 is calibrated at one calibration point 362 at about 25° C. The graph 360 displays the temperature error in ° C. on the y-axis 364 versus the temperature in ° C. on the x-axis 366.

Using the differential voltage (dV) and one-point calibration results in a temperature error of between about −3.5° C. and about 0.5° C. at −25° C. and between about −4.5° C. and about 2° C. at 125° C. The error is about +/−2.5° C. at −25° C. and about +/−3.5° C. at 125° C.

Thus, as illustrated in FIGS. 19 and 20, using the differential voltage (dV) between the first IDR unit 300 and the second IDR unit 302, and between the first IDR layout 320 and the second IDR layout 330 with one-point calibration to determine the temperature of a device results in a reduction in the temperature error over using only the resistance R1 of the first IDR unit 300 and the first IDR layout 320 with one-point calibration.

Figure 21:
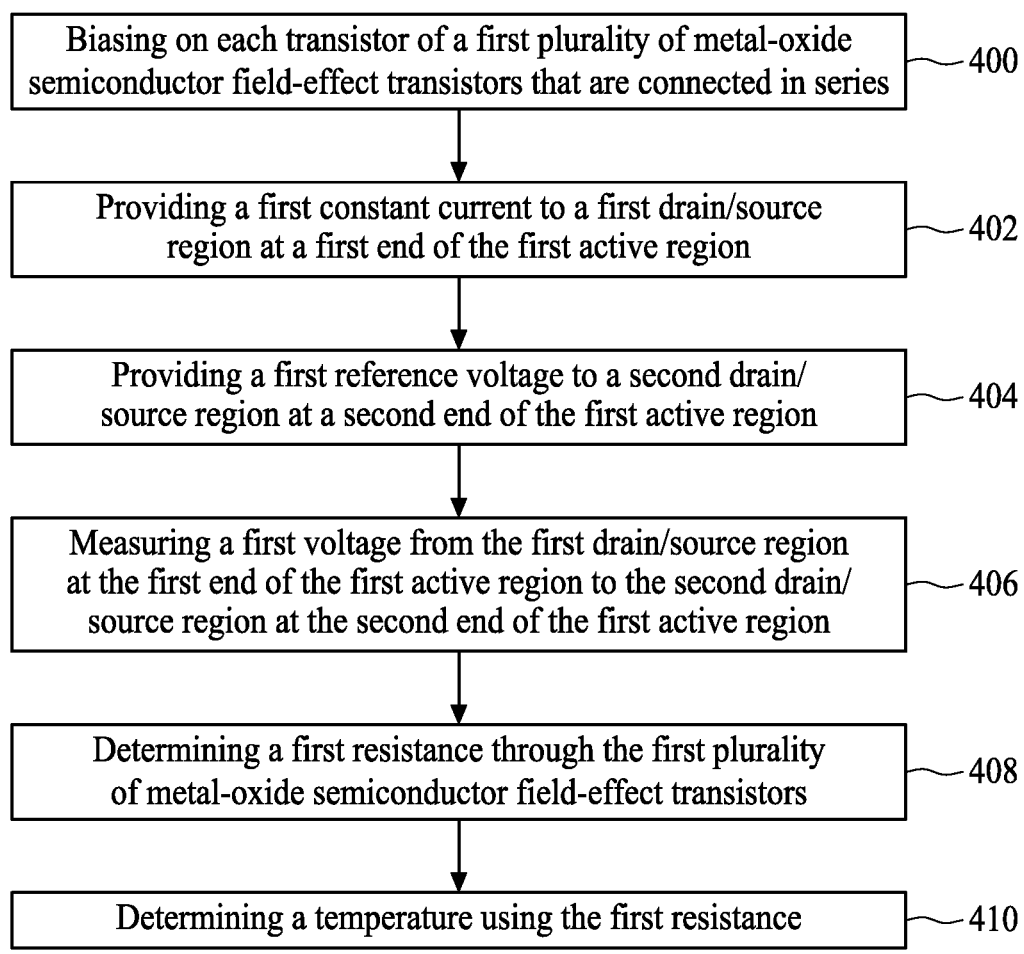
FIG. 21 is a diagram schematically illustrating a method of measuring/determining temperature in a device, in accordance with some embodiments.

FIG. 21 is a diagram schematically illustrating a method of measuring temperature in a device, in accordance with some embodiments. At 400, the method includes biasing on each transistor of a first plurality of MOSFETs that are connected in series. Each of the transistors in the first plurality of MOSFETs is biased on by providing a first bias voltage to first gate structures of the MOSFETs situated across a first active region and spaced apart from one another.

At 402, the method includes providing a first constant current to a first drain/source region at a first end of the first active region and, at 404, providing a first reference voltage to a second drain/source region at a second end of the first active region. Thus, the first constant current flows through the drain/source paths of the first plurality of MOSFETs.

At 406, the method includes measuring a first voltage from the first drain/source region at the first end of the first active region to the second drain/source region at the second end of the first active region and, at 408, the method includes determining a first resistance through the first plurality of MOSFETs. In some embodiments, determining the first resistance includes determining the first resistance from the measured first voltage and from the first constant current. At 410, the method includes determining a temperature using the first resistance.

In some embodiments, the method includes biasing on each transistor of a second plurality of MOSFETs that are connected in series by providing a second bias voltage to second gate structures situated across a second active region and spaced apart from one another. A second constant current is provided to a third drain/source region at a first end of the second active region, and a second reference voltage is provided to a fourth drain/source region at a second end of the second active region. Also, the method includes measuring a second voltage from the first drain/source region at the first end of the second active region to the second drain/source region at the second end of the second active region and determining a second resistance through the first plurality of MOSFETs. In some embodiments the first constant current is equal to the second constant current. In some embodiments, the method includes determining the temperature based on a difference between the first resistance and the second resistance.

In some embodiments, the method includes biasing on each of a second plurality of MOSFETs that are connected in series by providing the first bias voltage to second gate structures that are situated across a second active region and spaced apart from one another. In some embodiments, a third drain/source region at a first end of the second active region is connected to the first drain/source region, and a fourth drain/source region at a second end of the second active region is connected to the second drain/source region. In some embodiments, determining the first resistance through the first plurality of MOSFETs includes determining the first resistance through the parallel combination of the first plurality of MOSFETs and the second plurality of MOSFETs.

Disclosed embodiments thus include devices that include one or more IDR for measuring a temperature of the device. Each of the IDRs provides a resistance that is dependent on the temperature of the IDR in the device. The IDR includes a plurality of MOSFETs that are electrically connected in series, such that the drain/source paths of the MOSFETs are connected in series to one another. Each of the MOSFETs includes a gate structure that is electrically connected to a voltage that biases on the corresponding MOSFET. This provides a temperature dependent resistance through the drain/source paths of the series connected MOSFETs. The measured voltage/current/resistance through the series connected MOSFETs is used to determine a temperature of the device, such as the temperature near or at a hot spot in the device.

In some embodiments, an IDR resistance is measured through each of multiple series connected MOSFET circuits to measure or determine a temperature of the device. In some embodiments, an IDR resistance is measured through a parallel connected combination of multiple series connected MOSFET circuits to determine a temperature of the device. In some embodiments, a differential voltage and/or resistance is measured between different IDR units to determine a temperature of the device.

Disclosed embodiments further include IDR units arranged in rows and columns in a device to measure a temperature of the device. Also, disclosed embodiments include IDR units arranged in rows and columns in a device and arranged next to and/or around a hot spot of the device to measure a temperature of the hot spot of the device.

Advantages of using one or more IDRs to measure a temperature in a device include: having a thermal sensing function without having an N-well diffusion layer; having an alternative to P/N junctions, sub-threshold MOSFET operations, and RTDs in thermal sensing; and increasing the accuracy of determining the temperature of a hot spot area, where the series connected MOSFETs can be placed near the hot spot being monitored. Also, the series connected MOSFETs can be laid-out in the same layers as other MOSFETs, which reduces or saves on routing efforts; the size of the MOSFETs can be the same as other MOSFETs in the device, such that the IDR thermal sensor can be easily combined and/or merged with the core device area; and the IDR thermal sensor is independent of MOSFET process changes, since the series connected MOSFETs are always biased on and since most of the inversion diffusivity resistance is in the diffusion area and not in the inversion area under the gate structure.

In accordance with some embodiments, a device includes a first plurality of metal-oxide semiconductor field-effect transistors electrically connected in series. Each of the first plurality of metal-oxide semiconductor field-effect transistors includes a first gate structure, a first drain/source region on one side of the first gate structure, and a second drain/source region on another side of the first gate structure. The first gate structure of each of the first plurality of metal-oxide semiconductor field-effect transistors is configured to receive a bias voltage to bias on the first plurality of metal-oxide semiconductor field-effect transistors and provide a temperature dependent resistance through the first plurality of metal-oxide semiconductor field-effect transistors to measure temperatures.

In accordance with further embodiments, a device includes a hot spot area and an array of temperature sensing units arranged in rows and/or columns proximate the hot spot area and configured to measure a temperature of the hot spot area. Each of the temperature sensing units includes an active region and a plurality of gate structures that are spaced apart from one another and cross the active region.

In accordance with still further disclosed aspects, a method of measuring temperature includes biasing on each transistor of a first plurality of metal-oxide semiconductor field-effect transistors that are connected in series by providing a first bias voltage to first gate structures situated across a first active region and spaced apart from one another; providing a first constant current to a first drain/source region at a first end of the first active region; providing a first reference voltage to a second drain/source region at a second end of the first active region; measuring a first voltage from the first drain/source region at the first end of the first active region to the second drain/source region at the second end of the first active region; determining a first resistance through the first plurality of metal-oxide semiconductor field-effect transistors; and determining a temperature using the first resistance.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device, comprising:
a first plurality of metal-oxide semiconductor field-effect transistors electrically connected in series, each of the first plurality of metal-oxide semiconductor field-effect transistors including:
a first gate structure;
a first drain/source region on one side of the first gate structure;
and a second drain/source region on another side of the first gate structure,
wherein the second drain/source region of a first metal-oxide semiconductor field-effect transistor of the first plurality of metal-oxide semiconductor field-effect transistors is shared with the first drain/source region of a second metal-oxide semiconductor field-effect transistor of the first plurality of metal-oxide semiconductor field-effect transistors and the second drain/source region of the second metal-oxide semiconductor field-effect transistor of the first plurality of metal-oxide semiconductor field-effect transistors is shared with the first drain/source region of a third metal-oxide semiconductor field-effect transistor of the first plurality of metal-oxide semiconductor field-effect transistors, and
wherein the first gate structure of each of the first plurality of metal-oxide semiconductor field-effect transistors receives a bias voltage to bias the first plurality of metal-oxide semiconductor field-effect transistors and provide a first temperature dependent diffusion resistance in the shared second drain/source region of the first metal-oxide semiconductor field-effect transistor and the first drain/source region of the second metal-oxide semiconductor field-effect transistor and a second temperature dependent diffusion resistance in the shared second drain/source region of the second metal-oxide semiconductor field-effect transistor and the first drain/source region of the third metal-oxide semiconductor field-effect transistor
that are combined to provide a resistance through the first plurality of metal-oxide semiconductor field-effect transistors to measure temperatures.

2. The device of claim 1, wherein temperature dependent inversion layer resistances under the first gate structure of the first plurality of metal-oxide semidonductor field-effect transistors is combined with the first temperature dependent diffusion resistance and the secon temperature dependent diffusion resistance to measure temperatures.

3. The device of claim 1, wherein if each of the first plurality of metal-oxide semiconductor field-effect transistors is an n-type transistor, the first gate structure of each of the first plurality of metal-oxide semiconductor field-effect transistors is electrically connected to a positive voltage.

4. The device of claim 1, wherein if each of the first plurality of metal-oxide semiconductor field-effect transistors is a p-type transistor, the first gate structure of each of the first plurality of metal-oxide semiconductor field-effect transistors is electrically connected to ground.

5. The device of claim 1, wherein the first drain/source region of the first metal-oxide semiconductor field-effect transistors is electrically connected to a higher voltage and the second drain/source region of a last metal-oxide semiconductor field-effect transistor in the first plurality of metal-oxide semiconductor field-effect transistors is electrically connected to a lower voltage.

6. The device of claim 1, comprising:
a second plurality of metal-oxide semiconductor field-effect transistors electrically connected in series, each of the second plurality of metal-oxide semiconductor field-effect transistors including:
a second gate structure;
a third drain/source region on one side of the second gate structure; and
a fourth drain/source region on another side of the second gate structure,
wherein the third drain/source region of a first metal oxide semiconductor field-effect transistor in the second plurality of metal-oxide semiconductor field-effect transistors is electrically connected to the first drain/source region of the first metal-oxide semiconductor field-effect transistor in the first plurality of metal-oxide semiconductor field-effect transistors, and the fourth drain/source region of a last metal oxide semiconductor field-effect transistor in the second plurality of metal-oxide semiconductor field-effect transistors is electrically connected to the second drain/source region of a last metal-oxide semiconductor field-effect transistor in the first plurality of metal-oxide semiconductor field-effect transistors.

7. The device of claim 6, wherein the second gate structure of each of the second plurality of metal-oxide semiconductor field-effect transistors is electrically connected to a bias voltage configured to bias on each of the second plurality of metal-oxide semiconductor field-effect transistors.

8. The device of claim 6, wherein the fourth drain/source region of one of the second plurality of metal-oxide semiconductor field-effect transistors is shared with the third drain/source region of an adjacent one of the second plurality of metal-oxide semiconductor field-effect transistors.

9. The device of claim 1, comprising an active region, wherein the first gate structure of each of the first plurality of metal-oxide semiconductor field-effect transistors crosses the active region.

10. A device, comprising:
a first plurality of metal-oxide semiconductor field-effect transistors, each of the first plurality of metal-oxide semiconductor field-effect transistors including:
a first gate structure;
a first drain/source region on one side of the first gate structure; and
a second drain/source region on another side of the first gate structure,
wherein the second drain/source region of a first metal-oxide semiconductor field-effect transistor of the first plurality of metal-oxide semiconductor field-effect transistors is shared with the first drain/source region of a second metal-oxide semiconductor field-effect transistor of the first plurality of metal-oxide semiconductor field-effect transistors, and
wherein the first gate structure of the first metal-oxide semiconductor field-effect transistor and the first gate structure of the second metal-oxide semiconductor field-effect transistor receive bias voltages that bias on the first metal-oxide semiconductor field-effect transistor and the second metal-oxide semiconductor field-effect transistor to provide:
a temperature dependent diffusion resistance in the shared second drain/source region of the first metal-oxide semiconductor field-effect transistor and the first drain/source region of the second metal-oxide semiconductor field-effect transistor; and
temperature dependent inversion layer resistances under the first gate structure of the first metal-oxide semiconductor field-effect transistor and the first gate structure of the second metal-oxide semiconductor field-effect transistor that are combined with the temperature dependent diffusion resistance to provide a resistance through the first plurality of metal-oxide semiconductor field-effect transistors to measure temperatures.

11. The device of claim 10, wherein if each of the first plurality of metal-oxide semiconductor field-effect transistors is an n-type transistor, the first gate structure of each of the first plurality of metal-oxide semiconductor field-effect transistors is electrically connected to a positive voltage.

12. The device of claim 10, wherein if each of the first plurality of metal-oxide semiconductor field-effect transistors is a p-type transistor, the first gate structure of each of the first plurality of metal-oxide semiconductor field-effect transistors is electrically connected to ground.

13. The device of claim 10, wherein the first drain/source region of the first metal-oxide semiconductor field-effect transistor is electrically connected to a higher voltage and the second drain/source region of a last metal-oxide semiconductor field-effect transistor in the first plurality of metal-oxide semiconductor field-effect transistors is electrically connected to a lower voltage.

14. The device of claim 10, comprising:
a second plurality of metal-oxide semiconductor field-effect transistors, each of the second plurality of metal-oxide semiconductor field-effect transistors including:
a second gate structure;
a third drain/source region on one side of the second gate structure; and
a fourth drain/source region on another side of the second gate structure,
wherein the third drain/source region of a first metal-oxide semiconductor field-effect transistor in the second plurality of metal-oxide semiconductor field-effect transistors is electrically connected to the first drain/source region of the first metal-oxide semiconductor field-effect transistor in the first plurality of metal-oxide semiconductor field-effect transistors, and the fourth drain/source region of a last metal-oxide semiconductor field-effect transistor in the second plurality of metal-oxide semiconductor field-effect transistors is electrically connected to the second drain/source region of a last metal-oxide semiconductor field-effect transistor in the first plurality of metal-oxide semiconductor field-effect transistors.

15. The device of claim 14, wherein the fourth drain/source region of one of the second plurality of metal-oxide semiconductor field-effect transistors is shared with the third drain/source region of an adjacent one of the second plurality of metal-oxide semiconductor field-effect transistors.

16. A device, comprising:
a first plurality of metal-oxide semiconductor field-effect transistors, each of the first plurality of metal-oxide semiconductor field-effect transistors including:
a first gate structure;
a first drain/source region on one side of the first gate structure; and
a second drain/source region on another side of the first gate structure; and
a second plurality of metal-oxide semiconductor field-effect transistors, each of the second plurality of metal-oxide semiconductor field-effect transistors including:
a second gate structure;
a third drain/source region on one side of the second gate structure; and
a fourth drain/source region on another side of the second gate structure,
wherein the third drain/source region of a first metal-oxide semiconductor field-effect transistor in the second plurality of metal-oxide semiconductor field-effect transistors is electrically connected to the first drain/source region of a first metal-oxide semiconductor field-effect transistor in the first plurality of metal- oxide semiconductor field-effect transistors, and the fourth drain/source region of a last metal-oxide semiconductor field-effect transistor in the second plurality of metal-oxide semiconductor field-effect transistors is electrically connected to the second drain/source region of a last metal-oxide semiconductor field-effect transistor in the first plurality of metal-oxide semiconductor field-effect transistors, and
wherein the first gate structure of each of the first plurality of metal-oxide semiconductor field-effect transistors and the second gate structure of each of the second plurality of metal-oxide semiconductor field-effect transistors receive a bias voltage to bias on the first plurality of metal-oxide semiconductor field-effect transistors and the second plurality of metal-oxide semiconductor field-effect transistors to provide a first temperature dependent diffusion resistance between adjacent first gate structures and a second temperature dependent diffusion resistance between adjacent second gate structures that are combined to provide a resistance to measure temperatures.

17. The device of claim 16, wherein temperature dependent inversion layer resistances under the first gate structure of each of the first plurality of metal-oxide semiconductor field-effect transistors and under the second gate structure of each of the second plurality of metal-oxide semiconductor field-effect transistors are combined with the first temperature dependent diffusion resistance and the second temperature dependent diffusion resistance to measure temperatures.

18. The device of claim 16, wherein if each of the first plurality of metal-oxide semiconductor field-effect transistors is an n-type transistor, the first gate structure of each of the first plurality of metal-oxide semiconductor field-effect transistors is electrically connected to a positive voltage.

19. The device of claim 16, wherein if each of the first plurality of metal-oxide semiconductor field-effect transistors is a p-type transistor, the first gate structure of each of the first plurality of metal-oxide semiconductor field-effect transistors is electrically connected to ground.

20. The device of claim 16, wherein the first drain/source region of the first metal-oxide semiconductor field-effect transistor is electrically connected to a higher voltage and the second drain/source region of a last metal-oxide semiconductor field-effect transistor in the first plurality of metal-oxide semiconductor field-effect transistors is electrically connected to a lower voltage.

* * * * *